(12) United States Patent
Sugiyama et al.

(10) Patent No.: US 8,483,083 B2
(45) Date of Patent: Jul. 9, 2013

(54) COMPUTER PRODUCT, TESTING APPARATUS, AND TESTING METHOD

(75) Inventors: Taichi Sugiyama, Kawasaki (JP); Takeshi Yasuie, Kawasaki (JP); Yuji Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 328 days.

(21) Appl. No.: 13/072,351

(22) Filed: Mar. 25, 2011

(65) Prior Publication Data
US 2012/0026905 A1 Feb. 2, 2012

(30) Foreign Application Priority Data

Jul. 28, 2010 (JP) ................................ 2010-169748

(51) Int. Cl.
*H04L 12/26* (2006.01)

(52) U.S. Cl.
USPC .......................................... 370/252; 370/236

(58) Field of Classification Search
USPC .................. 370/235, 236, 252, 394
See application file for complete search history.

(56) References Cited

U.S. PATENT DOCUMENTS

| | | | |
|---|---|---|---|
| 5,761,486 A | 6/1998 | Watanabe et al. | |
| 7,120,125 B2 | 10/2006 | Kikuchi et al. | |
| 7,430,177 B2 * | 9/2008 | Mir et al. | 370/241 |
| 2006/0274667 A1 * | 12/2006 | Mir et al. | 370/252 |
| 2011/0085611 A1 * | 4/2011 | Laroia et al. | 375/260 |
| 2011/0136439 A1 * | 6/2011 | Tan et al. | 455/67.11 |
| 2011/0151797 A1 * | 6/2011 | Michl et al. | 455/67.11 |

FOREIGN PATENT DOCUMENTS

| | | |
|---|---|---|
| JP | 9-62601 | 3/1997 |
| JP | 10-13465 | 1/1998 |
| JP | 2003-8648 | 1/2003 |
| JP | 2008-191837 | 8/2008 |

* cited by examiner

*Primary Examiner* — Brian D Nguyen
(74) *Attorney, Agent, or Firm* — Fujitsu Patent Center

(57) ABSTRACT

A computer-readable medium stores a program causing a computer to execute acquiring a transmission interval for packets transmitted from a first-source to a first-destination; judging whether a given packet, among the packets whose destination has been changed to a second-destination are transmitted from a second-source, is a designated-packet requiring acknowledgment for the preceding packet; transmitting the given packet after acknowledgment is received, if acknowledgment is required; correcting an interval between the designated-packet and the subsequent packet, to be shorter than intervals for 2 packets transmitted from the first-source to the first-destination and corresponding to the designated-packet and the subsequent packet, if an interval between transmission of the preceding packet and transmission of the designated-packet exceeds intervals for 2 packets transmitted from the first-source to the first-destination and corresponding to the preceding packet and the designated-packet; and transmitting the subsequent packet from the second-source to the second-destination, at the corrected interval.

13 Claims, 23 Drawing Sheets

FIG.10

| | Transmission Packet Number | Session ID | Elapsed Time | IP Header Information | | TCP Header Information | | | | | | | | Application Header Information | Payload | Wait Flag | Transmission Packet Interval | | | Response Packet Interval (Standby System) |
|---|---|---|---|---|---|---|---|---|---|---|---|---|---|---|---|---|---|---|---|---|
| | | | | Source IP | Destination IP | Source Port | Destination Port | Sequence Number | Acknowledgment Number | SYN | ACK | PSH | FIN | | | | Main System | Standby System | Wait Time | |
| r1 | 1 | def | 10 | 50.50.50.50 | 30.30.30.30 | 2000 | 80 | | | 1 | - | - | - | - | ... | 0 | 10 | 10 | 0 | - |
| r2 | - | def | 24 | 30.30.30.30 | 50.50.50.50 | 80 | 2000 | | | 1 | 1 | - | - | - | ... | - | - | - | - | - |
| r3 | 2 | def | 24 | 50.50.50.50 | 30.30.30.30 | 2000 | 80 | | | - | 1 | - | - | - | ... | 1 | 10 | 14 | 4 | - |
| ... | ... | ... | ... | ... | ... | ... | ... | ... | ... | ... | ... | ... | ... | ... | ... | ... | ... | ... | ... | ... |
| r11 | 1 | xyz | 10 | 50.50.50.50 | 30.30.30.30 | 2000 | 80 | | | 1 | - | - | - | http request | ... | 0 | 10 | 10 | 0 | - |
| r12 | - | xyz | 28 | 30.30.30.30 | 50.50.50.50 | 80 | 2000 | | | - | 1 | 1 | - | http response set-cookie | ... | - | - | - | - | - |
| r13 | 2 | xyz | 28 | 50.50.50.50 | 30.30.30.30 | 2000 | 80 | | | - | 1 | - | - | http request | ... | 1 | 10 | 18 | 8 | - |
| r15 | 3 | xyz | 30 | 50.50.50.50 | 30.30.30.30 | 2000 | 80 | | | - | 1 | - | - | http request | ... | 0 | 10 | 2 | 0 | - |
| r17 | 4 | xyz | 40 | 50.50.50.50 | 30.30.30.30 | 2000 | 80 | | | - | 1 | - | - | http request | ... | 0 | 10 | 10 | 0 | - |
| r14 | - | xyz | 46 | 30.30.30.30 | 50.50.50.50 | 80 | 2000 | | | - | 1 | - | - | http response | ... | - | - | - | - | 18 |
| r16 | - | xyz | 48 | 30.30.30.30 | 50.50.50.50 | 80 | 2000 | | | - | 1 | - | - | http response | ... | - | - | - | - | 2 |
| r18 | - | xyz | 58 | 30.30.30.30 | 50.50.50.50 | 80 | 2000 | | | - | 1 | - | - | http response | ... | - | - | - | - | 10 |

800

COMPUTER PRODUCT, TESTING APPARATUS, AND TESTING METHOD

CROSS REFERENCE TO RELATED APPLICATIONS

This application is based upon and claims the benefit of priority of the prior Japanese Patent Application No. 2010-169748, filed on Jul. 28, 2010, the entire contents of which are incorporated herein by reference.

FIELD

The embodiment discussed herein is related to device testing.

BACKGROUND

Conventionally, technology has been disclosed for evaluating performance between client servers (see, for example, Japanese Laid-Open Patent Publication No. 2003-8648 and Japanese Laid-Open Patent Publication No. H9-62601). For example, upon system transitioning, technology that evaluates and tests performance to quickly and accurately verify a standby system server is demanded. Conventionally, such technology has performed processing as described below.

FIG. 22 depicts an example of relative performance evaluation processing for a main system server and a standby system server. In the example depicted in FIG. 22, a main system server A and a testing terminal C are located in Osaka, while a standby system server B is located in Tokyo. The main system server A, for example, is a computer of a system that is in use and operating on a current system. The standby system server B is a computer to which transition will occur from the main system server A. In this case, when testing using identical patterns (a packet and the acknowledgement packet thereof), the test conductor uses the testing terminal C to capture packets from the main system server A and provides the captured packets to the standby system server B in the same sequence pattern as that of the main system server A.

FIG. 23 depicts another example of relative performance evaluation processing for a conventional main system server and a standby system server. In the example depicted in FIG. 23, the main system server A is located in Osaka, the standby system server B is located in Tokyo, and the testing terminal C is provided in both Osaka and Tokyo. In this case, the test conductor performs packet communication between the testing terminal C and the main system server A in Osaka and at the same time interval as the main system server A, performs packet communication between the testing terminal C and the standby system server B in Tokyo, whereby relative performance evaluation of the main system server A and the standby system server B is performed.

Nonetheless, if the main system server A and the standby system server B are at different locations, the difference (distance and positive correlation) in the round trip times (RTT), i.e., the round trip delay times, of the main system server A and the standby system server B affects the processing interval (processing load) of the main system server A and the standby system server B. In other words, the interval of packet transmission/reception at the standby system server B is comparatively longer than that at the main system server A. Consequently, performance evaluation using equivalent loads cannot be performed, inviting deterioration in the quality of the performance evaluation.

Further, a packet may be sent after analysis of the information included in the acknowledgment packet of a packet previously transmitted, such as in the case of 3-way handshake, inclusion of a cookie in a packet, etc. In such cases, since transmission to the standby system server B requires waiting for an acknowledgment packet to be received for the packet previously transmitted, the packet transmission/reception interval of the standby system server B becomes comparatively longer than that of the main system server A. Consequently, performance evaluation using equivalent loads cannot be performed, inviting deterioration in the quality of the performance evaluation.

SUMMARY

According to an aspect of an embodiment, a computer-readable, non-transitory medium stores therein a testing program that causes a computer to execute a process that includes acquiring a transmission time interval for plural packets sequentially transmitted from a first transmission source to a first transmission destination; judging, when the packets whose destination has been changed to a second transmission destination are sequentially transmitted, from a second transmission source, according to the acquired transmission time interval, whether a given packet to be transmitted is a designated packet requiring reception of an acknowledgment packet transmitted from the second transmission destination for a preceding packet transmitted before the given packet; transmitting the given packet after the reception of the acknowledgment packet for the preceding packet, even if transmission timing according to the transmission time interval has passed, if the given packet is judged to be a designated packet; correcting, if a transmission time interval between transmission of the preceding packet and transmission of the designated packet exceeds transmission time intervals for 2 packets that correspond to the preceding packet and the designated packet and that are among the packets transmitted from the first transmission source to the first transmission destination, a transmission time interval between the designated packet and a subsequent packet transmitted subsequent to the designated packet, to be shorter than transmission intervals for 2 packets that correspond to the designated packet and the subsequent packet and that are among the packets transmitted from the first transmission source to the first transmission destination; and transmitting the subsequent packet from the second transmission source to the second transmission destination, at the corrected transmission time interval.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 8, 9, 10, 11, 12, and 13 depict examples of the contents of a packet information DB.

DESCRIPTION OF EMBODIMENTS

Preferred embodiments of the present invention will be explained with reference to the accompanying drawings. In the following description a "packet" may be referred to as a "transmission packet" and "acknowledgment packet". Here, a transmission packet is a packet transmitted to a first transmission destination (e.g., a main system server A) under test and/or a second transmission destination under test (e.g., a standby system server B). An acknowledgment packet is a packet received from the first transmission destination or the second transmission destination with respect to the transmission of a transmission packet. Further, a "preceding packet" is the transmission packet, 1-packet before a given transmission packet and a "subsequent packet" is the next transmission packet after the given transmission packet.

Figure 1:
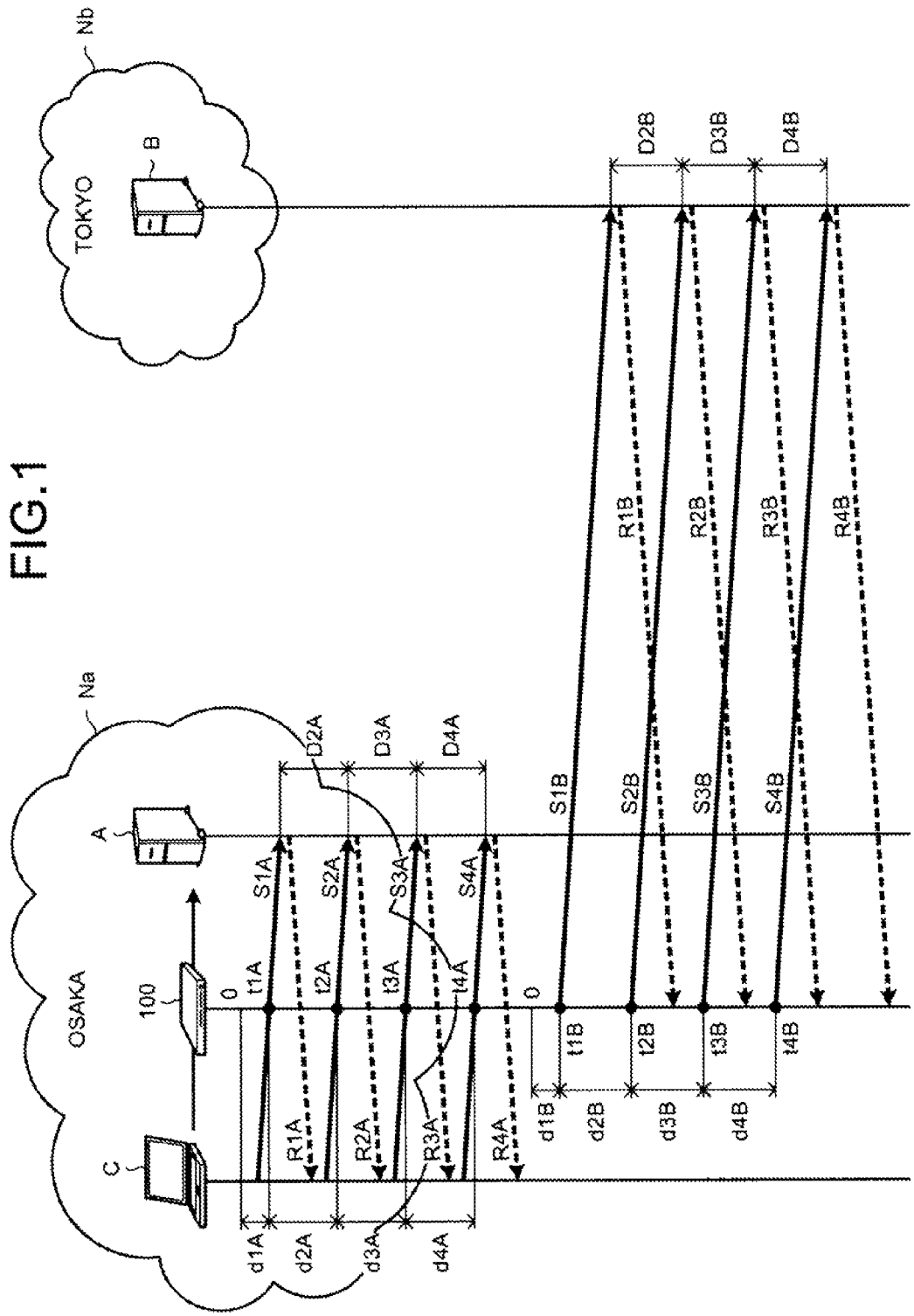
FIG. 1 depicts a first example of packet transmission according to an embodiment.

FIG. 1 depicts a first example of packet transmission according to an embodiment. In the example depicted in FIG. 1, a testing terminal C, and a main system server A as an example of a first transmission destination under test are located Osaka, while a standby system server B as an example of a second transmission destination under test is located Tokyo. The arrangement locations of the servers A and B is merely an example and a different arrangement may be adopted. The main system server A, for example, is a computer in a system that is in use and operating under a current system. The standby system server B is a computer to which transition will occur from the main system server A.

A testing apparatus 100 is communicably connected to the testing terminal C, the main system server A, and the standby system server B. For example, the testing apparatus 100, the testing terminal C, and the main system server A are on the same network (network Na) and can communicate with a network Nb on which the standby system server B is provided. The testing apparatus 100 may be integrated with the testing terminal C, in which case, the testing apparatus 100 further performs the processing executed by the testing terminal C.

For example, the transmission of packet S1A from the testing terminal C to the main system server A causes the main system server A to transmit packet R1A to the testing terminal C as a response. Subsequently, the transmission of packet S2A from the testing terminal C to the main system server A causes the main system server A transmit packet R2A to the testing terminal C as a response.

Next, the transmission of packet S3A from the testing terminal C to the main system server A causes the main system server A to transmit packet R3A to the testing terminal C as a response. Subsequently, the transmission of packet S4A from the testing terminal C to the main system server A causes the main system server A to transmit packet R4A to the testing terminal C as a response.

Here, the testing apparatus 100 captures the packets in the sequence of packet S1A, R1A, S2A, R2A, S3A, R3A, S4A, and R4A. Times t1A to t4A are the times, based on the start of the test as a reference, when the testing apparatus 100 captures packets S1A to S4A. The time of the start of the test (t=0), used as a reference, may be the time when the testing apparatus 100 receives a start signal from the testing terminal C or the time when the testing apparatus 100 receives test start input. Further, the time used as the reference may be the time at which the first packet (packet S1A) from the testing terminal C is captured. In any case, the time of the start of the test need not be synchronized between the testing terminal C and the testing apparatus 100.

Each transmission time interval d1A to d4A when packets S1A to S4A are transmitted from the testing terminal C to the main system server A is the elapsed time between consecutive packets. In other words, the elapsed time can be expressed using the times of capture at the testing apparatus 100 (times t1A to t4A). For example, the transmission time interval d1A from the start of the test until the transmission of packet S1A is d1A=t1A−0.

The transmission time interval d2A from the transmission of packet S1A (the preceding packet of packet S2A) until the transmission of packet S2A is d2A=t2A−t1A. Similarly, the transmission time interval d3A from the transmission of packet S2A (the preceding packet of packet S3A) until the transmission of packet S3A is d3A=t3A−t2A; and the transmission time interval d4A from the transmission of packet S3A (the preceding packet of packet S4A) until the transmission of packet S4A is d4A=t4A−t3A.

Further, D2A is the reception time interval between packets S1A and S2A, at the main system server A. D3A is the reception time interval between packets S2A and S3A, at the main system server A. D4A is the reception time interval between packets S3A and S4A, at the main system server A. These reception time intervals are the respective acknowledgment time intervals between the reception of acknowledgment packets R1A and R2A; between the reception of the packets R2A and R3A; and between the reception of the packets R3A and R4A, by the testing apparatus 100.

The testing apparatus 100 rewrites the destination of packets S1A to S4A to the main system server A, from the address of the main system server A to the address of the standby system server B to generate packets S1B to S4B. The testing apparatus 100 transmits the generated packets S1B to S4B to the standby system server B, respectively, at the transmission time intervals d1B(=d1A), d2B(=d2A), d3B(=d3A), and d4B(=d4A).

Here, by using the address of the testing apparatus 100 as the transmission source address of packets S1B to S4B, the transmission destination of acknowledgment packets R1B to R4B from the standby system server B becomes the testing apparatus 100. Further, the testing terminal C may receive acknowledgment packets R1B to R4B, without changing the transmission source of packets S1B to S4B.

The testing apparatus 100 transmits packet S1B to the standby system server B when t1B(=t1A) has elapsed since the start of the test; transmits packet S2B to the standby system server B when t2B(=t2A) has elapsed since the start of the test; transmits packet S3B to the standby system server B when t3B(=t3A) has elapsed since the start of the test; and transmits packet S4B to the standby system server B when t4B(=t4A) has elapsed since the start of the test.

D2B is the reception time interval between packets S1B and S2B, at the standby system server B. D3B is the reception time interval between packets S2B and S3B, at the standby system server B. D4B is the reception time interval between packets S3B and S4B, at the standby system server B. These reception time intervals are the respective acknowledgment time intervals between the reception of acknowledgment packets R1B and R2B; between the reception of packets R2B and R3B; and between the reception of packets R3B and R4B, by the testing apparatus 100.

In the sequence between the testing terminal C and the main system server A, when the testing terminal C receives acknowledgment packet R1A from the main system server A, the testing terminal C transmits packet S2A to the main system server A; when the testing terminal C receives acknowledgment packet R2A from the main system server A, the testing terminal C transmits packet S3A to the main system server A; and when the testing terminal C receives acknowledgment packet R3A from the main system server A, the testing terminal C transmits packet S4A to the main system server A.

In contrast, in the sequence between the testing apparatus 100 and the standby system server B, when the standby system server B receives packets S1B to S4B, like the main system server A, the standby system server B returns acknowledgment packets R1B to R4B. Here, packets S2B to S4B from the testing apparatus 100 are transmitted maintaining the transmission time intervals d1B to d4B identical to the transmission time intervals d1A to d4A, without waiting for reception of acknowledgment packets R1B to R3B for packets S1B to S3B, from the standby system server B.

Thus, since packet transmission is performed in the same sequence (transmission time intervals d1A to d4A) at the main system server A and at the standby system server B, the reception time intervals are also the same, D2A=D2B, D3A=D3B, and D4A=D4B. Therefore, by converting packets S1A to S4A to absorb effects of differing installation locations, the main system server A and the standby system server B are evaluated and tested for performance using equivalent loads. Subsequently, by comparing acknowledgment packets R1A to R4A from the main system server A and acknowledgment packets R1B to R4B from the standby system server B, an evaluation of relative performance can be executed with respect to the main system server A and the standby system server B.

Figure 2:
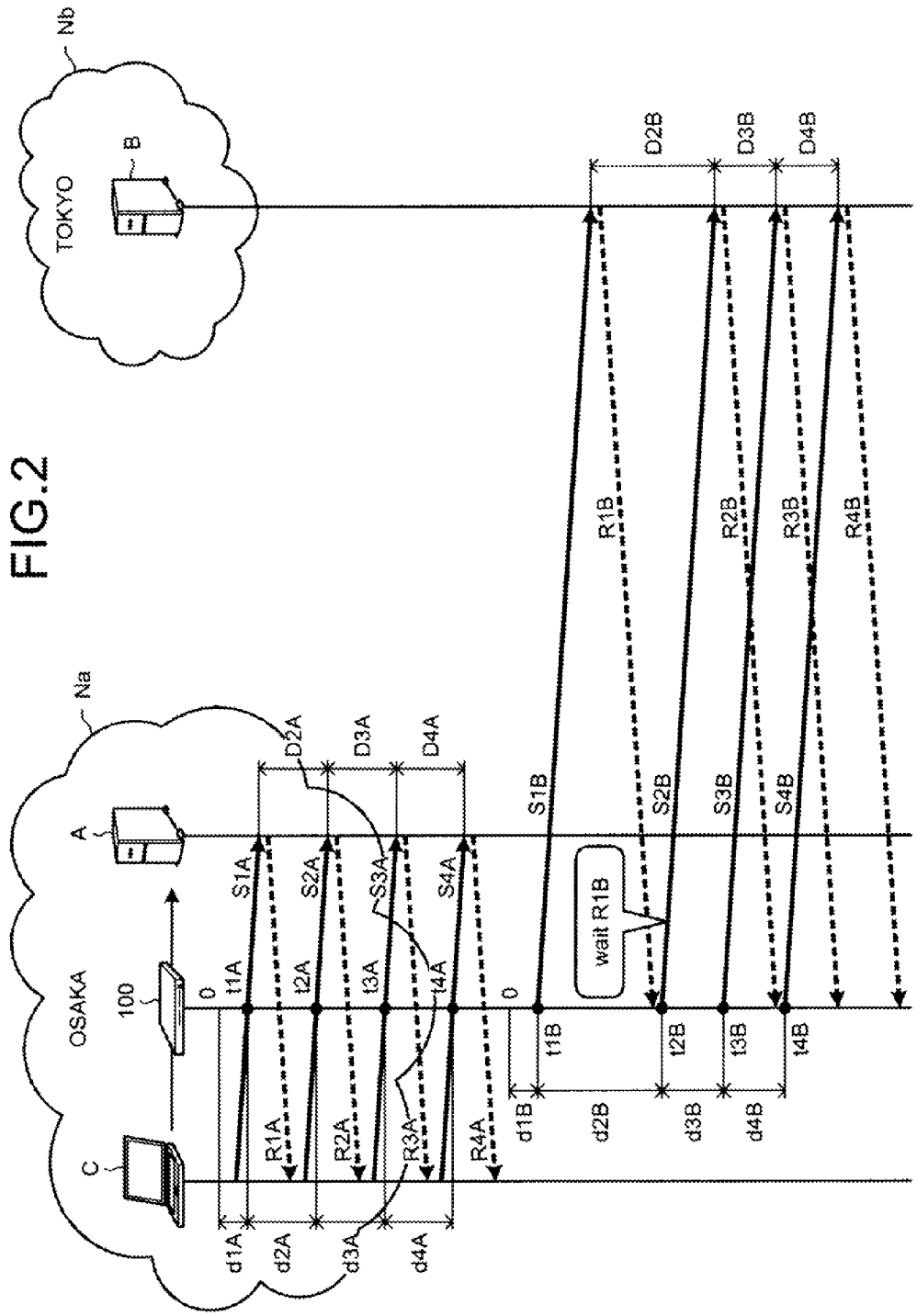
FIG. 2 depicts a second example of packet transmission according to the embodiment.

FIG. 2 depicts a second example of packet transmission according to the embodiment. As depicted in FIG. 2, a difference compared to the first example depicted in FIG. 1 is that packet S2B is transmitted after waiting for the reception of packet R1B because packet S2B, which is packet S2A whose destination has been changed to the standby system server B, requires information in packet R1B. Consequently, although packet S1B (the preceding packet of packet S2B) is transmitted after the elapse of time equivalent to transmission time interval d1B(=d1B–0), from the start of the test, packet S2B is transmitted after the elapse of time equivalent to the transmission time interval d2B(=t2B–t1B). The transmission time interval d2B is longer than the transmission time interval d2A. Consequently, the corresponding reception time interval D2B at the standby system server B is also longer that the reception time interval D2A.

Although the transmission of packet S2B is delayed, packets S3B and S4B subsequent to packet S2B are transmitted at the same transmission time intervals d3B(=t3B–t2B) and d4B(=t4B–t3B) depicted in FIG. 1 and consequently, the corresponding reception time intervals D3B and D4B are identical to those depicted in FIG. 1. Excluding the difference above other aspects of the second example are identical to those of the first example.

Transmission delay such as that of packet S2B, for example, occurs in 3-way handshake, when packets S1A and S1B are SYN packets, acknowledgment packets R1A and R1B are SYN/ACK packets, and/or packets S2A and S2B are ACK packets. Further, if cookie information is embedded in the Hyper Text Transfer Protocol (HTTP) acknowledgment headers of acknowledgment packets R1A and R1, the HTTP request headers of packets S2A and S2B have to be changed. In cases such as these, transmission delay occurs such as with packet S2B.

If delay occurs such as that occurring with packet S2B, the respective loads at the main system server A and the standby system server B become different (D2A<D2B). As a result, the transmission timing for packets S3B and S4B subsequent to packet S2B has to be corrected.

Figure 3:
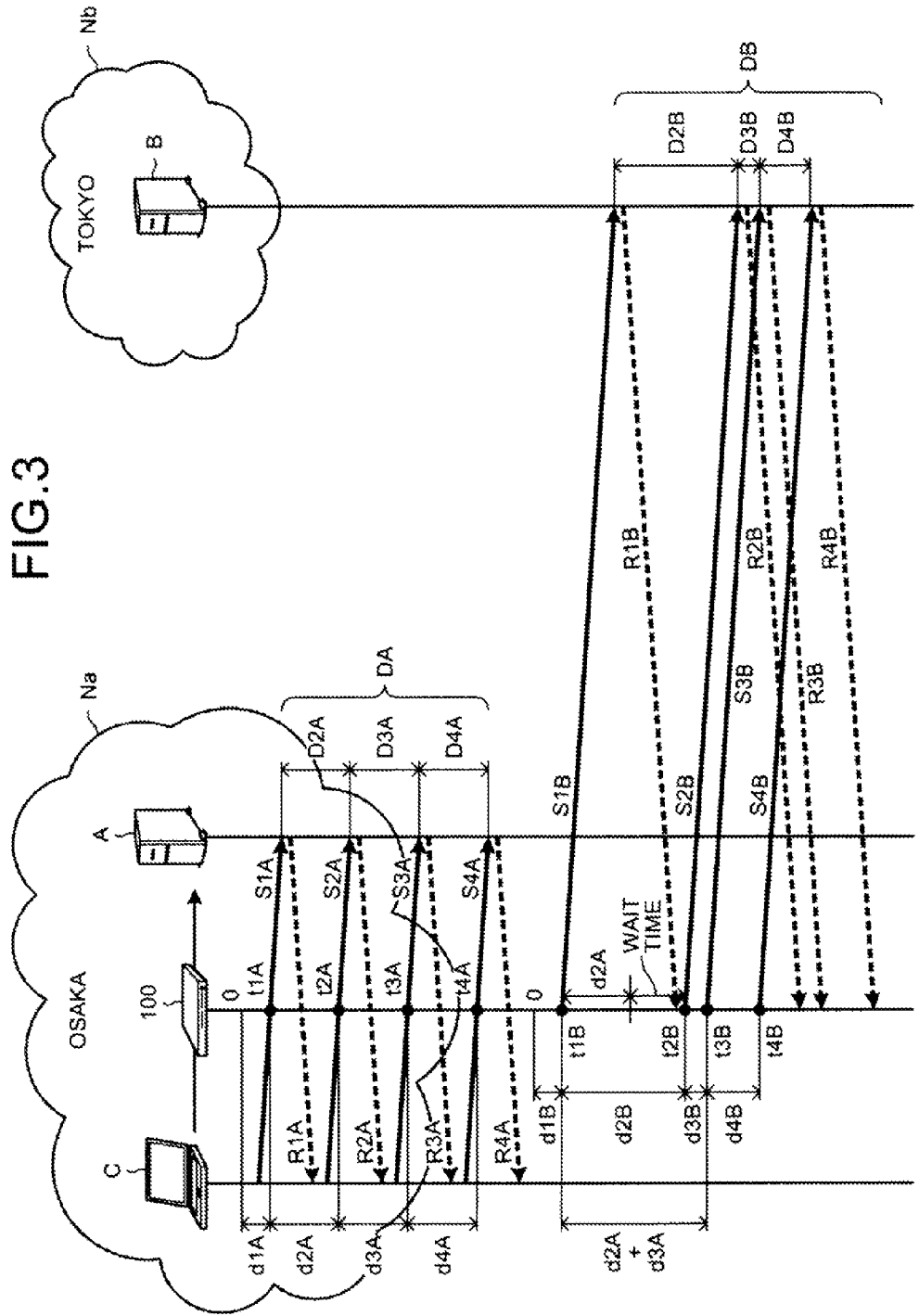
FIG. 3 depicts a first example of correction of the packet transmission depicted in FIG. 2.

FIG. 3 depicts a first example of correction of the packet transmission depicted in FIG. 2. In the example depicted in FIG. 3, by adjusting the transmission timing of packet S3B (the subsequent packet of packet S2B), the transmission delay of packet S2B is corrected so that the load at the main system server A and the standby system server B become equivalent. Hereinafter, [msec] is used an example of a unit of time.

For example, d2B>d2A results consequent to the transmission delay of packet S2B. Therefore, transmission time interval d3B from the transmission of packet S2B until the transmission of packet S3B is shortened to effect d2B+d3B=d2A+d3A.

For example, assume that the transmission time intervals d1A to d4A, d1B, d3B, d4B prior to correction (the state depicted in FIG. 2) are 10[msec], respectively, and the transmission time interval d2B is 18[msec], i.e., relative to the transmission time interval d2A(=10[msec]) at the main system server A, the transmission time interval d2B is delayed by 8[msec] (=18[msec]–10[msec]). This period of delay is referred to as "wait time".

In this case, the transmission time interval d3B of packet S3B subsequent to packet S2B is shortened by the wait time (8[msec]), becoming d3B=2[msec]. In other words, the subsequent packet (packet S3B) is transmitted 2[msec] after packet S2B is received, not 10[msec] thereafter. By such correction, d2B+d3B=d2A+d3A is achieved.

In this way, the processing interval D3B of the standby system server B is also conjunctively shortened and the sum DA (D2A+D3A+D4A) of the reception time intervals at the main system server A and the sum DB (D2B+D3B+D4B) of the processing intervals at the standby system server B become equivalent. Consequently, the main system server A and the standby system server B are under equivalent loads.

Figure 4:
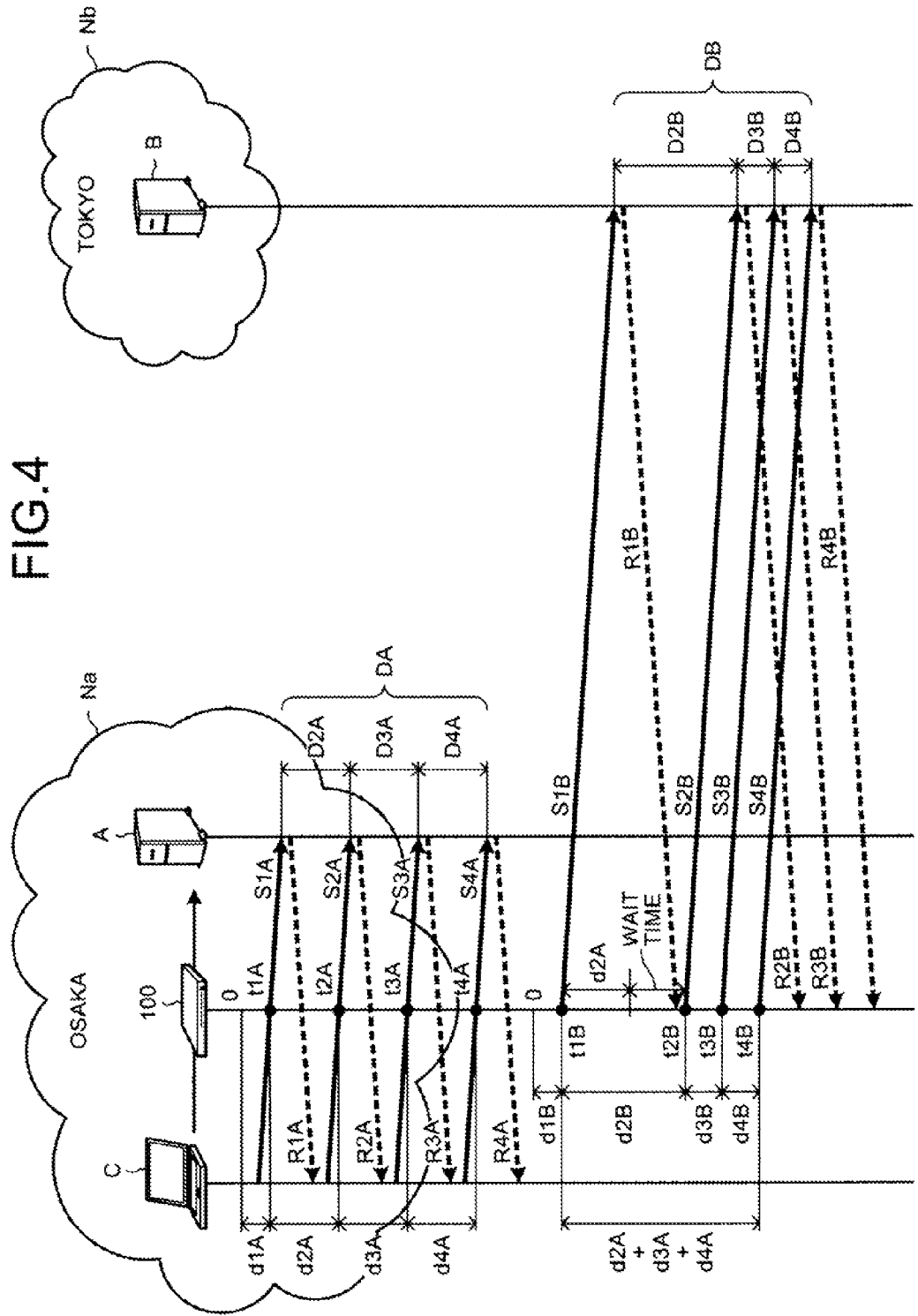
FIG. 4 depicts a second example of correction of the packet transmission depicted in FIG. 2.

FIG. 4 depicts a second example of correction of the packet transmission depicted in FIG. 2. In FIG. 4, similarly to FIG. 3, by adjusting the transmission timing of packet S3B (the subsequent packet of packet S2B), the transmission delay of packet S2B is corrected so that the load at the main system server A and the load at the standby system server B become equivalent. A difference in the example depicted in FIG. 3 compared to that depicted in FIG. 4 is that in FIG. 3, the time interval d3B of the subsequent packet (packet S3B) is shortened, whereas in FIG. 4, the transmission time interval d3B and the transmission time interval d4B of a packet subsequent to packet S3B (in FIG. 4, packet S4B) are shortened, not that of packet S3B alone.

In the correction example depicted in FIG. 3, since the transmission time interval d3B of packet S3B alone is shortened, processing interval D3B at the standby system server B is shortened. In other words, at the standby system server B, the transmission of packets S2B and S3B and the transmission of acknowledgment packet R2B and R3B become localized. Therefore, in the example depicted in FIG. 4, the transmission time interval d4B of packet S4B is used, thereby distributing the load. For example, the transmission time intervals d3B and d4B are adjusted to become equivalent (d3B=d4B) after correction.

For example, in the example depicted in FIG. 3, the transmission time interval d2B becomes 18[msec] and the subsequent transmission time interval (transmission time interval d3B=10[msec]) is shortened by the additional wait time (8[msec]), becoming 2[msec] after correction. In contrast, in the example of FIG. 4, the additional wait time (8[msec]) is distributed between the transmission time intervals d3B and d4B at 4[msec] respectively (=10[msec]−4[msec]), thereby shortening the transmission time intervals to d3B=d4B=6 [msec]. Consequently, the reception time intervals at the standby system server B as well become equivalent (D3B=D4B), and the localized load at the standby system server B is distributed.

In the example of FIG. 4, although the transmission time intervals d3B and d4B of 2 packets subsequent to packet S2B (packets S3B and S4B) is used to distribute load, if transmission delay does not occur with packets transmitted to the standby system server B subsequent packet S4B, the transmission time intervals thereof may also be used to distribute load. In other words, the more packets subsequent to packet S2B, the more the additional time (herein, 8[msec]) is distributed and consequently, the more the corresponding reception time intervals at the standby system server B are equalized, enabling efficient load distribution.

Figure 5:
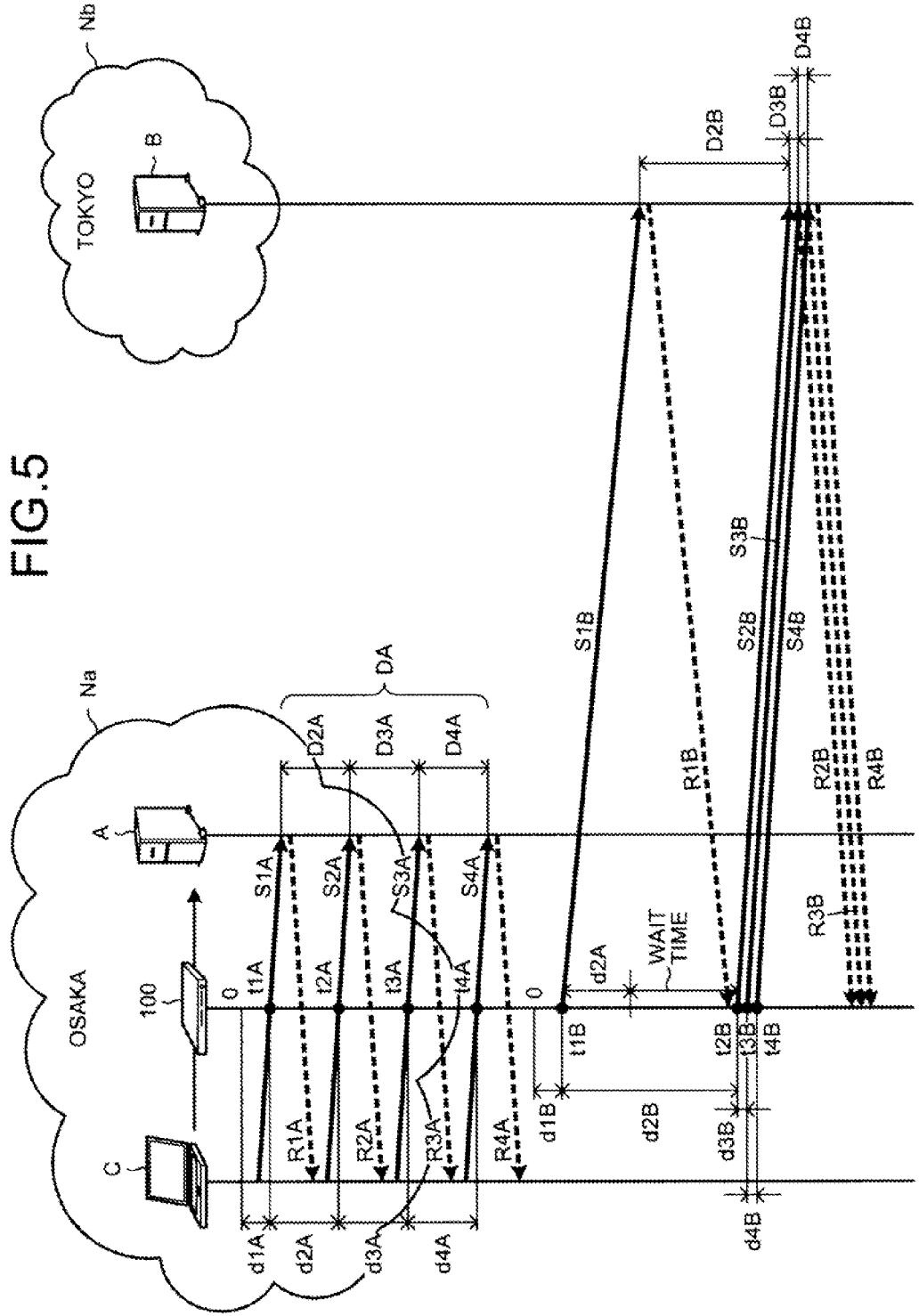
FIG. 5 depicts a third example of correction of the packet transmission depicted in FIG. 2.

FIG. 5 depicts a third example of correction of the packet transmission depicted in FIG. 2. FIG. 5 depicts an example of correcting an extremely long wait time that results from the transmission time interval d2B being prolonged by the transmission delay of packet S2B. In such a case, if the wait time is longer than the transmission time interval d3B of packet S3B (the subsequent packet of packet S2B), the transmission time interval d3B cannot be sufficiently shortened.

If a large number of packets follow packet S2B, the transmission time interval d4B as well as subsequent transmission time intervals are used, enabling the load distribution of the correction example depicted in FIG. 4. On the other hand, if a small number of packets follow packet S2B, the time intervals of all of the subsequent packets is set to a given value of 0[msec] or more, and the sum DB of the processing intervals at the standby system server B are corrected to such that DB≦DA.

Although the transmission time interval d2B is 18[msec] in the example depicted in FIG. 3, in the example depicted in FIG. 5, the transmission time interval d2B is 34[msec], i.e., the wait time is 24[msec]. The wait time of 24[msec] is greater than the transmission time interval d3B(=10[msec]) of packet S3B (the subsequent packet of packet S2B) and is further greater than the sum (=20[msec]) of the transmission time interval d3B(=10[msec]) of packet S3B and the transmission time interval d4B(=10[msec]) of packet S4B (the subsequent packet of packet S3B).

Consequently, since load distribution as depicted in the correction example of FIG. 4 cannot be performed, the transmission time intervals d3B and d4B are set to 0[msec] or more. Here, the transmission time intervals are assumed as d3B=d4B=1[msec], whereby the sum DB of the reception time intervals at the standby system server B is DB=D2B+D3B+D4B=24+1+1=26[msec], which is equal to or less than the sum DA of the processing intervals at the main system server A, whereby faster testing can be facilitated. The given value, at most, is set to be less than the uncorrected transmission time interval.

Figure 6:
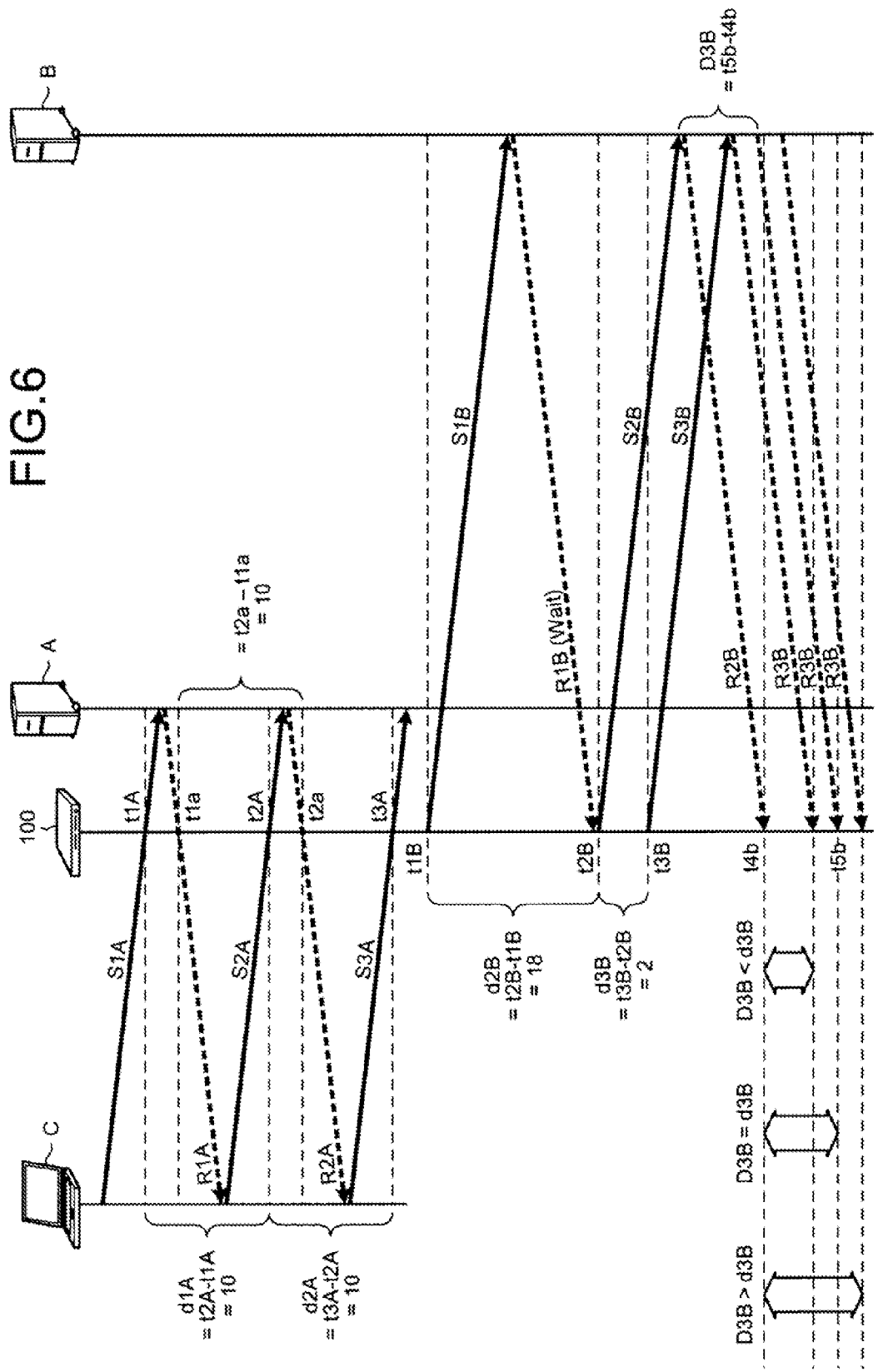
FIG. 6 depicts an example of performance evaluation.

FIG. 6 depicts an example of performance evaluation. FIG. 6 depicts an example of performance evaluation with respect to the example of packet transmission correction depicted in FIG. 3. When performance is evaluated, among the transmission time intervals for transmission to the standby system server B, an arbitrary transmission time interval is selected. Since a transmission time interval for transmission to the standby system server B is a time interval for transmitting a packet in an upbound direction from the testing apparatus 100 to the standby system server B, herein, such a transmission time interval is referred to as an upbound time interval.

The selected upbound time interval and the corresponding downbound time interval are compared. A downbound time interval is an acknowledgment time interval for transmitting an acknowledgment packet in a downbound direction from standby system server B to the testing apparatus 100. For example, if the transmission time interval d3B is selected as an upbound time interval, the transmission time interval d3B is compared with the corresponding acknowledgment time interval D3B.

In the performance evaluation, if the downbound time interval is greater than the upbound time interval, the main system server A is judged to have better performance than the standby system server B. Further, if the downbound time interval is equivalent to the upbound time interval, the performance of the main system server A and the standby system server B is judged to be equivalent. If the downbound time interval is less than the upbound time interval, the standby system server B is judged to have better performance than the main system server A.

An example of a testing apparatus realizing the test examples depicted in FIGS. 1 to 5 will be described.

Figure 7:
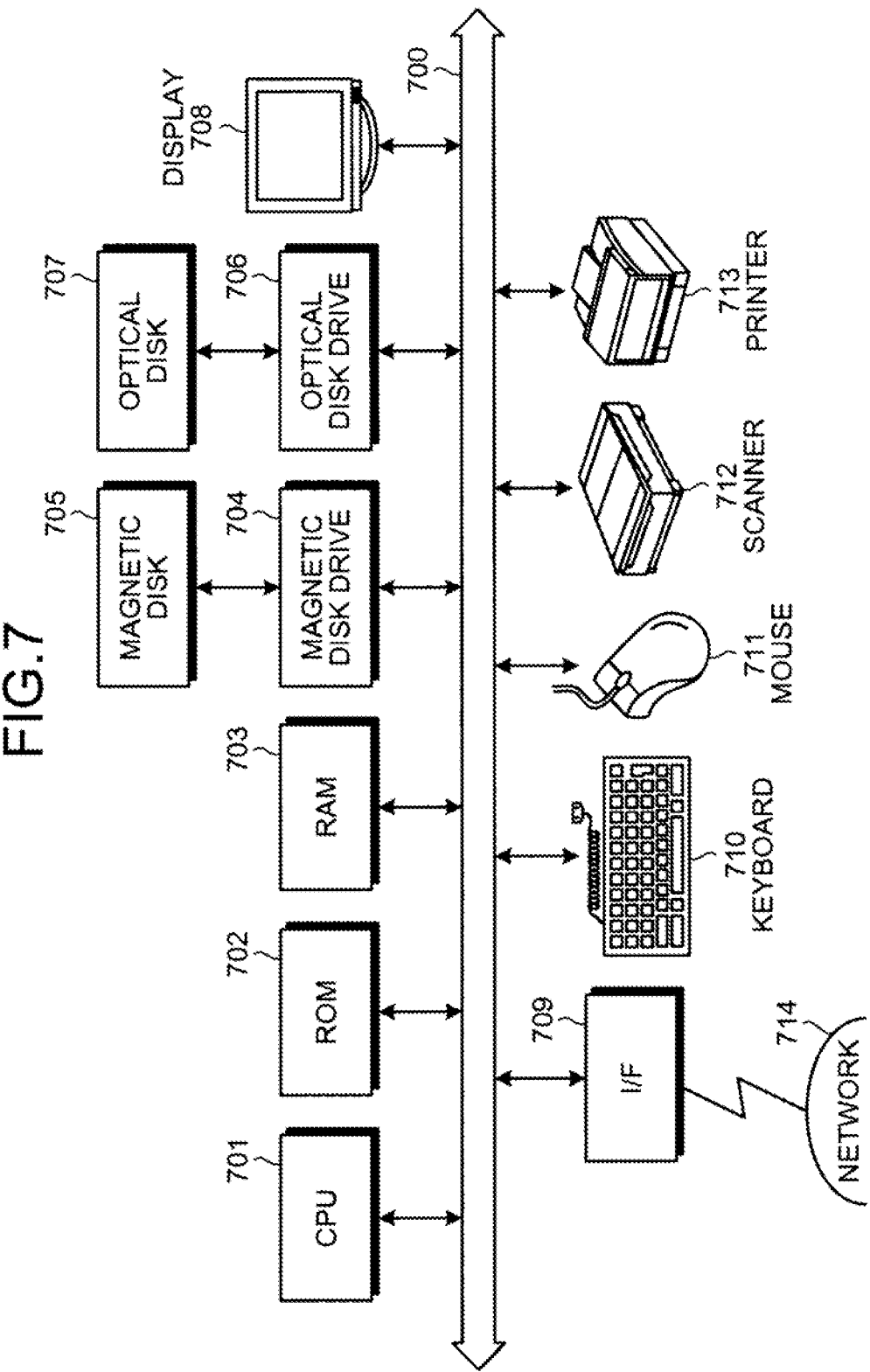
FIG. 7 is a block diagram of an exemplary hardware configuration of a computer.

FIG. 7 is a block diagram of an exemplary hardware configuration of a computer (testing terminal C, testing apparatus 100, main system server A, and standby system server B). As depicted in FIG. 7, the computer includes a central processing unit (CPU) 701, a read-only memory (ROM) 702, a random access memory (RAM) 703, a magnetic disk drive 704, a magnetic disk 705, an optical disk drive 706, an optical disk 707, a display 708, an interface (I/F) 709, a keyboard 710, a mouse 711, a scanner 712, and a printer 713, respectively connected by a bus 700.

The CPU 701 governs overall control of the computer. The ROM 702 stores therein various types of programs such as an operating system (OS) and applications. The RAM 703 is used as a work area of the CPU 701. The magnetic disk drive 704, under the control of the CPU 701, controls the reading and writing of data with respect to the magnetic disk 705. The magnetic disk 705 stores therein data written under control of the magnetic disk drive 704.

The optical disk drive 706, under the control of the CPU 701, controls the reading and writing of data with respect to the optical disk 707. The optical disk 707 stores therein data written under control of the optical disk drive 706, the data being read by the computer.

The display 708 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 708.

The I/F 709 is connected to a network 714 such as a local area network (LAN), a wide area network (WAN), and the Internet through a communication line and is connected to other apparatuses through the network 714. The I/F 709 administers an internal interface with the network 714 and controls the input/output of data from/to external apparatuses. For example, a modem or a LAN adaptor may be employed as the I/F 709.

The keyboard 710 includes, for example, keys for inputting letters, numerals, and various instructions and performs the input of data. Alternatively, a touch-panel-type input pad or numeric keypad, etc. may be adopted. The mouse 711 is used to move the cursor, select a region, or move and change the size of windows. A track ball or a joy stick may be adopted provided each respectively has a function similar to a pointing device.

The scanner 712 optically reads an image and takes in the image data into the computer. The scanner 712 may have an optical character reader (OCR) function as well. The printer 713 prints image data and text data. The printer 713 may be, for example, a laser printer or an ink jet printer.

A packet information DB used by the testing apparatus 100 according to the embodiment will be described. FIGS. 8 to 13 depict examples of the contents of the packet information DB. A function of a packet information DB 800, for example, is implemented by a storage device such as the RAM 703, the magnetic disk 705, and the optical disk 707 depicted in FIG. 7.

In FIGS. 8 to 13, the packet information DB 800 includes a transmission packet number column, a session ID column, an elapsed time column, an Internet Protocol (IP) header information column, a Transmission Control Protocol (TCP) header information column, an application header information column, a payload column, a wait time flag column, a transmission packet interval column, and an acknowledgment packet interval column.

The transmission packet number column stores, for each record, a transmission packet number concerning a transmission packet. Transmission packets having the same session ID are assigned a transmission packet number in descending order from the head transmission packet. Reception packets are not assigned transmission packet numbers.

The session ID column stores session IDs, where if the session is the same, the same session ID is stored.

The elapsed time column stores the time elapsing from the start of the test. For example, the time from the start of the test until the testing apparatus 100 captures a packet is stored as elapsed time. If the start of the test has been determined by the testing apparatus 100, the elapsed time for the packet first captured is the time from the start of the test until the packet is captured. If the first packet capture is regarded as the start of the test, the elapsed time for the packet first captured is 0.

The IP header information column includes a source IP column and a destination IP column. The source IP column stores the transmission source IP addresses described in the headers of captured packets. Further, the destination IP column stores the destination IP addresses described in the headers of captured packets.

In the examples depicted in FIGS. 8 to 13, an IP address of "10.10.10.10" is assumed for the testing terminal C; an IP address of "20.20.20.20" is assumed for the main system server A; an IP address of "30.30.30.30" is assumed for the standby system server B; and an IP address of "50.50.50.50" is assumed for the testing apparatus 100.

The TCP header information column includes a source port column, a destination port column, a sequence number column, an acknowledgment number column, and columns for various flags including SYN (synchronize), ACK (acknowledgment), PSH (push), FIN (communication finish), and RST (reset request).

The source port column stores the transmission source port numbers described in the headers of captured packets.

The destination port column stores the destination port numbers described in the headers of captured packets.

The sequence number column stores the sequence numbers described in the headers of captured packets. A sequence number is a random value assigned at the transmission source of a captured packet.

The acknowledgment number column stores the acknowledgment numbers described in the headers of captured packets. An acknowledgment number is a value assigned by a computer that has received a packet and is based on the sequence number of the received packet. For example, to obtain and an acknowledgment number, the computer adds "1" to the sequence number of a received packet.

The flag columns store flags (SYN, ACK, PSH, FIN, RST) indicating packet type. For example, the packet of record r1 is a SYN packet.

The application header information column stores header information related to applications such as HTTP and Post Office Protocol (POP)3/Internet Message Access Protocol (IMAP).

The payload column stores payload, which is the data included in a captured packet, excluding the header. The payload of packets may be stored or may be discarded.

The wait time flag column stores wait flag values (0/1). The default value is "0". If "0" has been set, a packet is transmitted without waiting for the reception of the acknowledgment packet for the preceding packet. If "1" has been set, the reception of the acknowledgment packet for the preceding packet is awaited and then, the packet is transmitted. The setting of the wait flag is described hereinafter.

The transmission packet interval column includes a main system column, a standby system column, and a wait time column.

The main system column stores the time that elapses from the transmission (to the main system server A) of a transmission packet that is 1-packet before a given transmission packet until the transmission of the given transmission packet to the main system server A. If the given transmission packet is the head transmission packet (a transmission packet having a transmission packet number of "1"), the time that elapses from the start of the test until the head transmission packet is transmitted to the main system server A is stored.

The standby system column stores the time that elapses from the transmission (to the standby system server B) of a transmission packet that is 1-packet before a given transmission packet until the transmission of the given transmission packet to the standby system server B. If the given transmission packet is a head transmission packet (a transmission packet having a transmission packet number of "1"), the time that elapses from the start of the test until the head transmission packet is transmitted to the standby system server B is stored.

The wait time column stores, as the wait time, the difference obtained by subtracting the time interval to the main system server A from the time interval to the standby system server B.

The acknowledgment packet interval column stores the time that elapses from the transmission (to the standby system server B) of the acknowledgment packet 1-packet before a given acknowledgment packet until the transmission of the given acknowledgment packet to the standby system server B. FIGS. 8 to 13 will be described individually.

Figure 8:
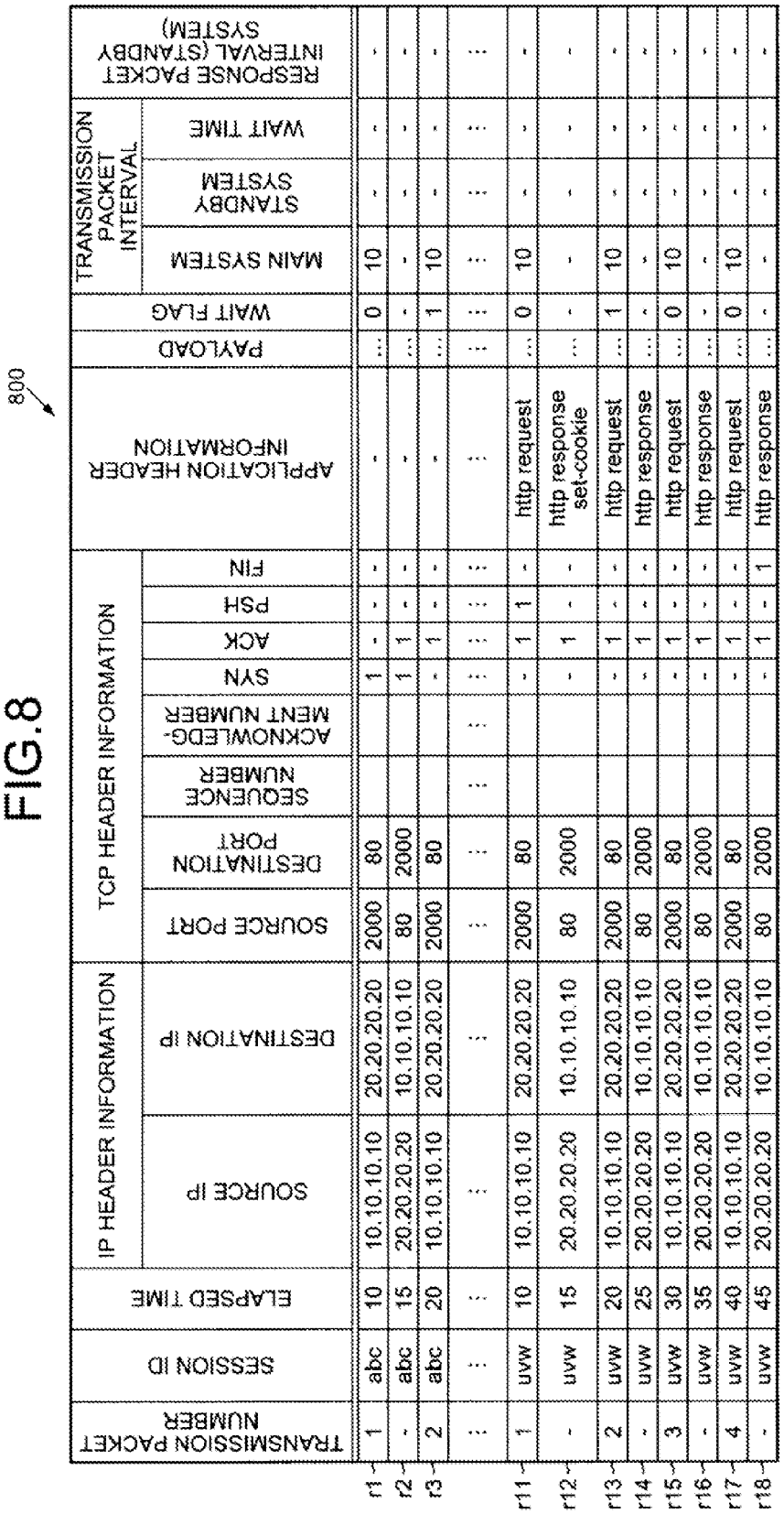

The packet information DB 800 depicted in FIG. 8 stores information concerning packets transmitted and received between the testing terminal C and the main system server A. For example, records r1 to r3 are records for packets having the same session ID(=abc), indicating a TCP/IP 3-way handshake between the testing terminal C and the main system server A. 3-way handshake involves a series of processes executing session establishment, data transfer, and session termination.

For example, the testing terminal C transmits, as a packet, a SYN packet (sequence number: random number at testing terminal C, acknowledgment number: 0, SYN flag) to the main system server A. This SYN packet corresponds to the transmission packet of record r1.

The main system server A, which has received the SYN packet transmits to the testing terminal C, a SYN/ACK packet (sequence number: random number at main system server A, acknowledgment number: sequence number of SYN packet +1, SYN flag, ACK flag). This SYN/ACK packet corresponds to the acknowledgment packet of record r2.

The testing terminal C, which has received the SYN/ACK packet, transmits, as a packet, an ACK packet (sequence number: acknowledgment number at main system server A, acknowledgment number: sequence number of SYN/ACK packet+1, ACK flag) to the main system server A. This ACK packet corresponds to the transmission packet of record r3.

The packet of record r3 is the ACK packet acknowledging the SYN/ACK packet of record r2, therefore, the reception of the SYN/ACK packet of record r2 is awaited and then, the packet of record r3 is transmitted from the testing terminal C to the main system server A. On such occasion, the testing apparatus 100 sets the wait flag of record r3 to ON (0→1).

Further, records r11 to r18 are records for packets having the same session ID(=uvw), e.g., packets S1A to S4A and R1A to R4A depicted in FIG. 2. For example, packets S1A to S4A are packets respectively of records r11, r13, r15, and r17. Similarly, packets R1A to R4A are respectively of records r12, r14, r16, and r18.

Among these packets, when packet S1A of record r11 is transmitted, the main system server A having received packet S1A, analyzes packet S1A to generate packet R1A of record r12 and having a cookie embedded in the acknowledgment header (application header).

Since packet S2A of record r13 has to use the cookie information embedded in packet R1A of record r12, the reception of packet R1A of record r12 is awaited and then, packet S2A is transmitted from the testing terminal C to the main system server A. On such occasion, the testing apparatus 100 sets the wait flag of record r13 to ON (0→1).

Figure 9:
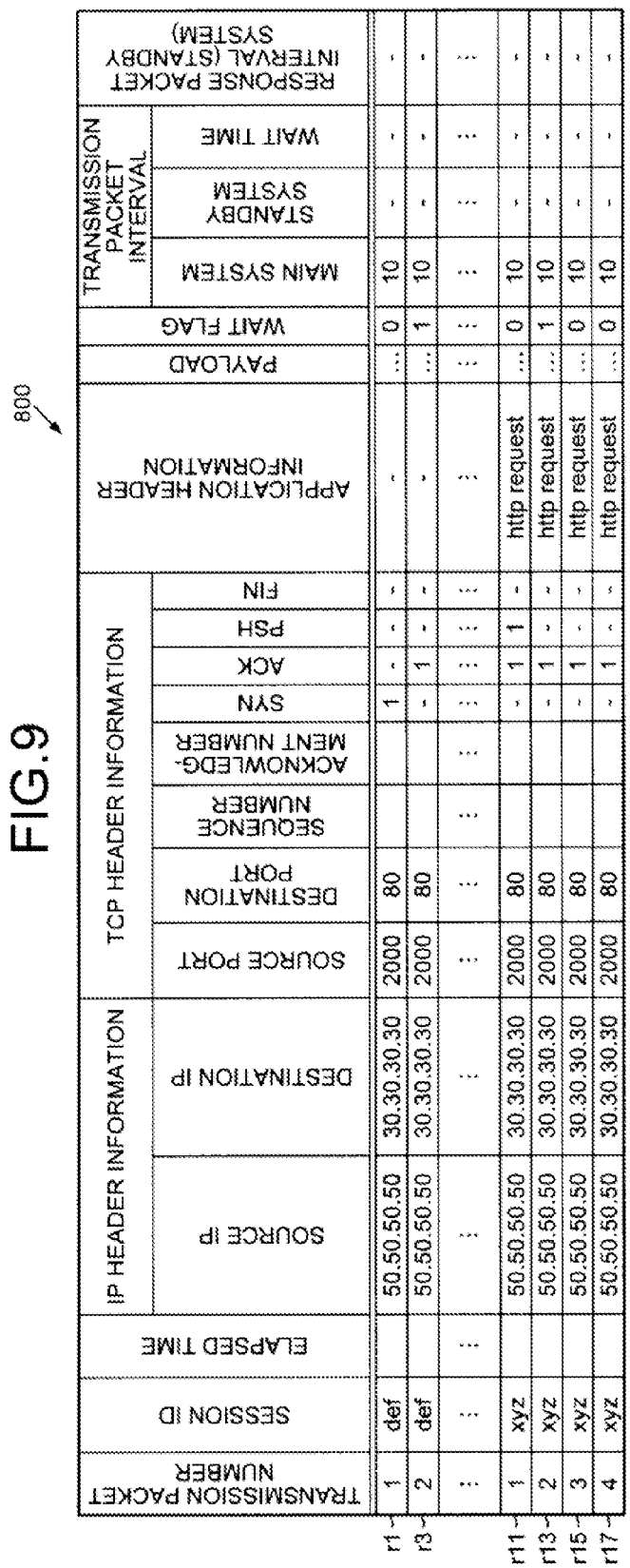

The packet information DB 800 depicted in FIG. 9 is an example of conversion by rewriting the destination IP address of the packets depicted in FIG. 8, from the main system server A to the standby system server B. The transmission source IP address is also rewritten from the testing terminal C to the testing apparatus 100. If the testing terminal C and the testing apparatus 100 are a single apparatus (have the same IP address), the transmission source IP address need not be rewritten.

According to the rewriting, the session IDs of records r1 to r3 are also rewritten from "abc" to "def". Similarly, the session IDs of records r11 to r18 are also rewritten from "uvw to "xyz". The sequence numbers and acknowledgment numbers can also be rewritten according to given rules to enable identification of the sequence of packet transmission/reception, an acknowledgment source packet, etc.

Consequent to this rewriting, transmission packets of records r1, r3, r11, r13, r15, and r17 become transmission packets from the testing apparatus 100 to the standby system server B. For example, transmission packets of records r1, r3, r11, r13, r15, and r17 become transmission packet S1B to S4B depicted in FIG. 2.

If the destination becomes the standby system server B, the testing apparatus 100 transmits the transmission packets of records r1, r3, r11, r13, r15, and r17 to the standby system server B, according to the time interval indicated in the main system column. For example, transmission packets S1B to S4B of record r11, r13, r15, and r17 are transmitted at 10[msec] time intervals from the start of the test.

In the state depicted in FIG. 9, since packets S1B to S4B have not yet been transmitted to the standby system server B, which is the destination after conversion, the elapsed time column is blank. Further, records r2, r12, r14, r16, r18 of acknowledgment packets are also deleted.

The packet information DB 800 depicted in FIG. 10 is a first example of the content of the packet information DB 800 when the converted transmission packets depicted in FIG. 9 have been transmitted to the standby system server B. In the example depicted in FIG. 10, records r2, r12, r14, r16, and r18 of acknowledgment packets are generated as depicted in FIG. 8.

If the wait flag is "0", the transmission packets of records r1, r3, r11, r13, r15, and r17 are transmitted to the standby system server B at the time intervals indicated in the main system column, without waiting for the reception of acknowledgment packets. For example, transmission packet S1B of record r11 is transmitted to the standby system server B 10[msec] after the start of the test. Upon transmission at the elapse of time equivalent to the time interval indicated in the main system column, the time interval indicated in the main system column is written to the standby system column.

Here, if the wait flag of the transmission packet to be transmitted is "1", reception of the acknowledgment packet for the transmission packet 1-packet before is awaited and then, the transmission packet is transmitted. For example, the reception of the acknowledgment packet R1B of record r12 is awaited and then, transmission packet S2B of record r13 is transmitted. Consequently, transmission packet S2B of record r13 is not transmitted 10[msec] after the transmission of transmission packet S1B of record r11, but rather is transmitted after the elapse of time equivalent to the time elapsing from the start of the test until the reception of acknowledgment packet R1B.

Since the time elapsing from the start of the test until the reception of acknowledgment packet R1B is 28[msec], transmission packet S2B is transmitted 18[msec] (=28[msec]−10[msec]) after the transmission of the preceding packet (transmission packet S1B). Therefore, in the elapsed time column of record r13, "28" is written and in the standby system column, "18" is written.

Since the time difference between transmission packets S2A and S2B in record r13 is 8[msec] (=18[msec]−10[msec]), in the wait time column, "8" is written. In other words, the transmission of transmission packet S2B to the standby system server B is delayed by 8[msec] relative to the transmission of transmission packet S2A to the main system server A.

In the example depicted in FIG. 10, by correcting the transmission period of transmission packet S3B of record r15

(the next packet), the wait time, which is the delay of transmission packet S2B, is absorbed. For example, since the wait flag of transmission packet S3B is "0", transmission packet S3B is transmitted 10[msec] after the transmission of the preceding packet, but the wait flag of the preceding packet (transmission packet S2B) is "1" and consequently, the time difference of 8[msec] (delay) at transmission packet S2B is subtracted from the time interval indicated in the main system column of transmission packet S3B to obtain the time difference in the standby system column.

In this case, the time interval in the standby system column of record r15 for transmission packet S3B is 2[msec] (=10[msec]−8[msec]). Therefore, transmission packet S3B of record r15 is transmitted 2[msec] after the reception of transmission packet S2B and "2" is written in the standby system column.

Since the wait flag in the subsequent record r17 for transmission packet S4B is "0", transmission packet S4B of record r17 is transmitted 10[msec] (as indicated in the main system column) after reception of transmission packet S3B and consequently, "10" is written in the standby system column. Thus, the sum of the time intervals of transmission packets S1A to S4A to the main system server A and the sum of the time intervals of transmission packets S1B to S4B to the standby system server B become equivalent, enabling the standby system server B to be tested under the same load as the main system server A.

Figure 11:
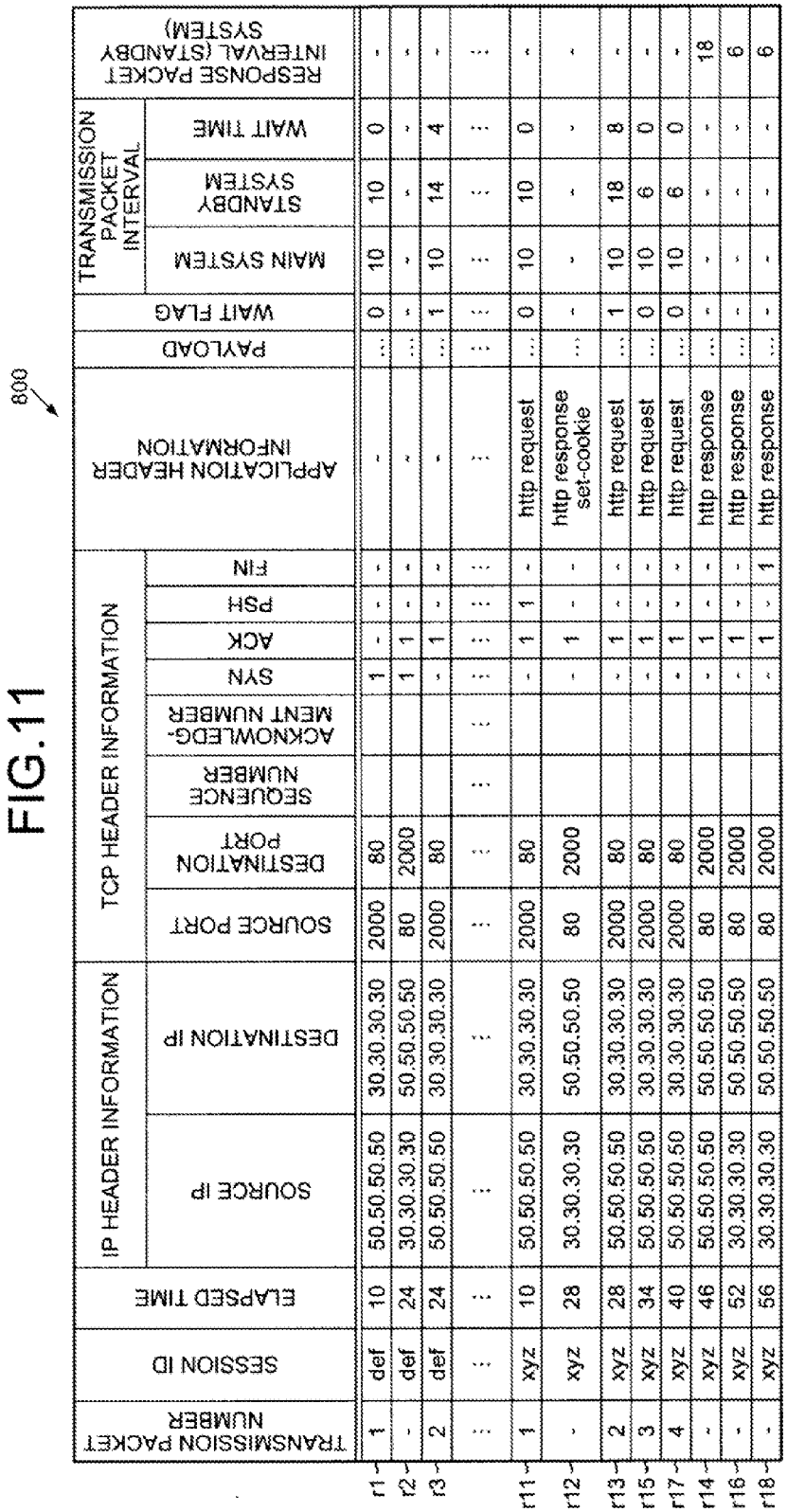

The packet information DB 800 depicted in FIG. 11 is a second example of the content of the packet information DB 800 when the converted transmission packets depicted in FIG. 9 have been transmitted to the standby system server B. The example depicted in FIG. 11 differs from that depicted in FIG. 10 in that, in the example of FIG. 10, as depicted in FIG. 3, the time interval of transmission packet S3B in record r15 is reduced by the delay (time difference 8[msec]) caused by transmission packet S2B of record r13, to equalize load.

Whereas, in the example depicted in FIG. 11, as depicted in FIG. 4, the sum of the time intervals of transmission packet S3B of record r15 and transmission packet S4B of record r17 (the wait flags of which are "0") is shortened by the delay (wait time 8[msec]) caused by transmission packet S2B of record r13 to equalize load.

For example, since the wait time (delay) caused by transmission packet S2B of record r13 is 8[msec], the wait time is divided by the number of packets whose time intervals are to be shortened, i.e., the time intervals of transmission packet S3B of record r15 and transmission packet S4B of record r17 are respectively shortened by 4[msec] (=8[msec]÷2 packets).

The sum of the time intervals of transmission packets S1A to S4A to the main system server A and the sum of the time intervals of transmission packets S1B to S4B to the standby system server B become equivalent, enabling the standby system server B to be tested under the same load as the main system server A.

Figure 12:
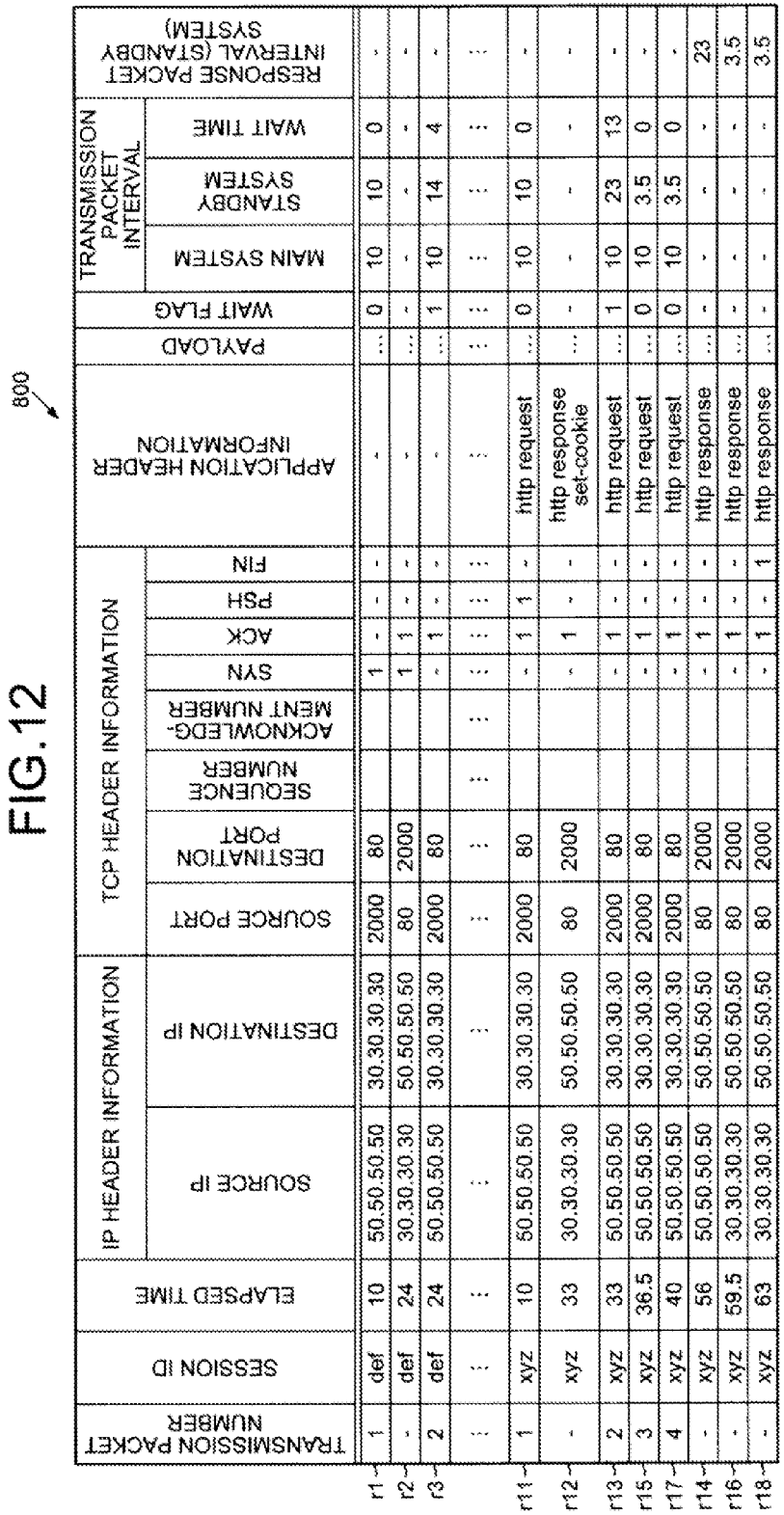

The packet information DB 800 depicted in FIG. 12 is a third example of the content of the packet information DB 800 when the converted transmission packets depicted in FIG. 9 have been transmitted to the standby system server B. In the example depicted in FIG. 12, acknowledgment packet R1B of record r12 is received by the testing apparatus 100, 33[msec] after the start of the test. In other words, transmission packet S2B of record r13 is transmitted 23[msec] (=33[msec]−10[msec]) after the transmission of the preceding packet (transmission packet S1B).

Consequently, in the elapsed time column of record r13, "33" is written and in the standby system column, "23" is written. Furthermore, since the time difference between transmission packets S2A and S2B in record r13 is 13[msec] (=23[msec]−10[msec]), in the wait time column, "13" is written. In other words, the transmission of transmission packet S2B to the standby system server B is delayed by 13[msec] relative to the transmission of transmission packet S2A to the main system server A.

In the example depicted in FIG. 10, adjustment is performed by shortening (by the delay) the time interval when the next transmission packet (transmission packet S3B) is transmitted, but in the present example, the wait time (delay) (=13[msec]) is greater than the time interval (=10[msec]) when the next transmission packet (transmission packet S3B) is to be transmitted. Consequently, the time interval (=10[msec]) of the transmission packet subsequent to transmission packet S3B (transmission packet S4B) is also used.

Since the sum of the time intervals of transmission packets S2B and S3B is 20[msec] (=10[msec]+10[msec]), the wait time (delay) (=13[msec]) can be absorbed and thus, as similarly depicted in FIG. 11, the time intervals of transmission packet S3B of record r15 and transmission packet S4B of record r17 are respectively shortened by 3.5[msec] {=(10[msec]+10[msec]−13[msec])÷2 packets}.

Consequently, the sum of the time intervals of transmission packets S1A to S4A to the main system server A and the sum of the time intervals of transmission packets S1B to S4B to the standby system server B become equivalent, enabling the standby system server B to be tested under the same load as the main system server A.

Figure 13:
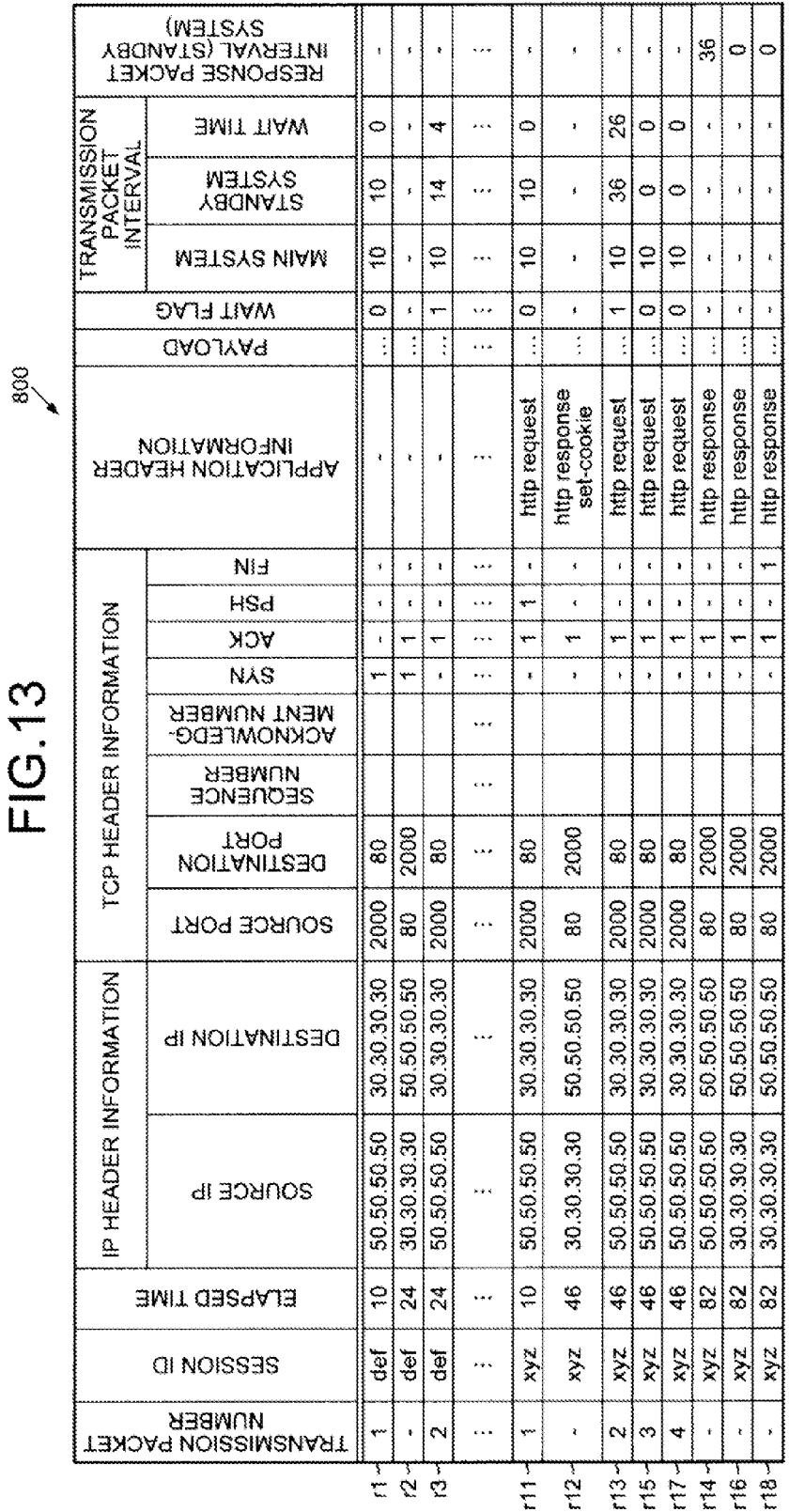

The packet information DB 800 depicted in FIG. 13 is a fourth example of the contents of the packet information DB 800 when the converted transmission packets depicted in FIG. 9 are transmitted to the standby system server B. In the example depicted in FIG. 12, if the wait time (delay) is greater than the time interval (=10[msec]) when the subsequent transmission packet (transmission packet S3B) is to be transmitted, adjustment is performed by using the time interval (=10[msec]) of the transmission packet subsequent to transmission packet S3B (transmission packet S4B). FIG. 13 depicts an example, where despite performing the adjustment in the example depicted in FIG. 12, adjustment cannot be performed, as in the example depicted in FIG. 5.

For example, it is assumed that acknowledgment packet R1B of record r12 is received 46[msec] after the start of the test. In this case, transmission packet S2B of record r13 is transmitted 36[msec] (=46[msec]−10[msec]) after the preceding packet (transmission packet S1B) and consequently, in the elapsed time column of record r13, "46" is written and in the standby system column, "36" is written.

Since the time difference between transmission packets S2A and S2B in record r13 is 26[msec] (=36[msec]−10[msec]), in the wait time column, "26" is written. In other words, the transmission of transmission packet S2B to the standby system server B is delayed by 26[msec] relative to the transmission of transmission packet S2A to the main system server A.

In the example depicted in FIG. 13, the sum (20[msec]=10[msec]+10[msec]) of the time intervals of all subsequent packets (transmission packets S3B and S4B) cannot absorb the wait time (delay) of 26[msec]. In such a case, the time intervals of all subsequent transmission packets (transmission packets S3B and S4B) are set to 0[msec] or more.

In other words, transmission packet S3B is transmitted at the elapse of a given time period after the delayed transmission of transmission packet S2B and transmission packet S4B is transmitted at the elapse of the given time period after the transmission of transmission packet S3B. In the present example, since the given time period is assumed to be 0[msec], transmission packets S3B and S4B are transmitted simultaneously with transmission packet S2B.

In this case, the sum of the time intervals of transmission packets S1A to S4A, to the main system server A is not necessarily equivalent to the sum of the time intervals of transmission packets S1B to S4B, to the standby system server B. In the example depicted in FIG. 13, the sum of the time intervals of transmission packets S1B to S4B, to the standby system server B is greater, but compared to not shortening as depicted in FIG. 13, the amount of the load on the standby system server B can be brought closer to the load on the main system server A, thereby improving the accuracy of the performance evaluation.

Figure 14:
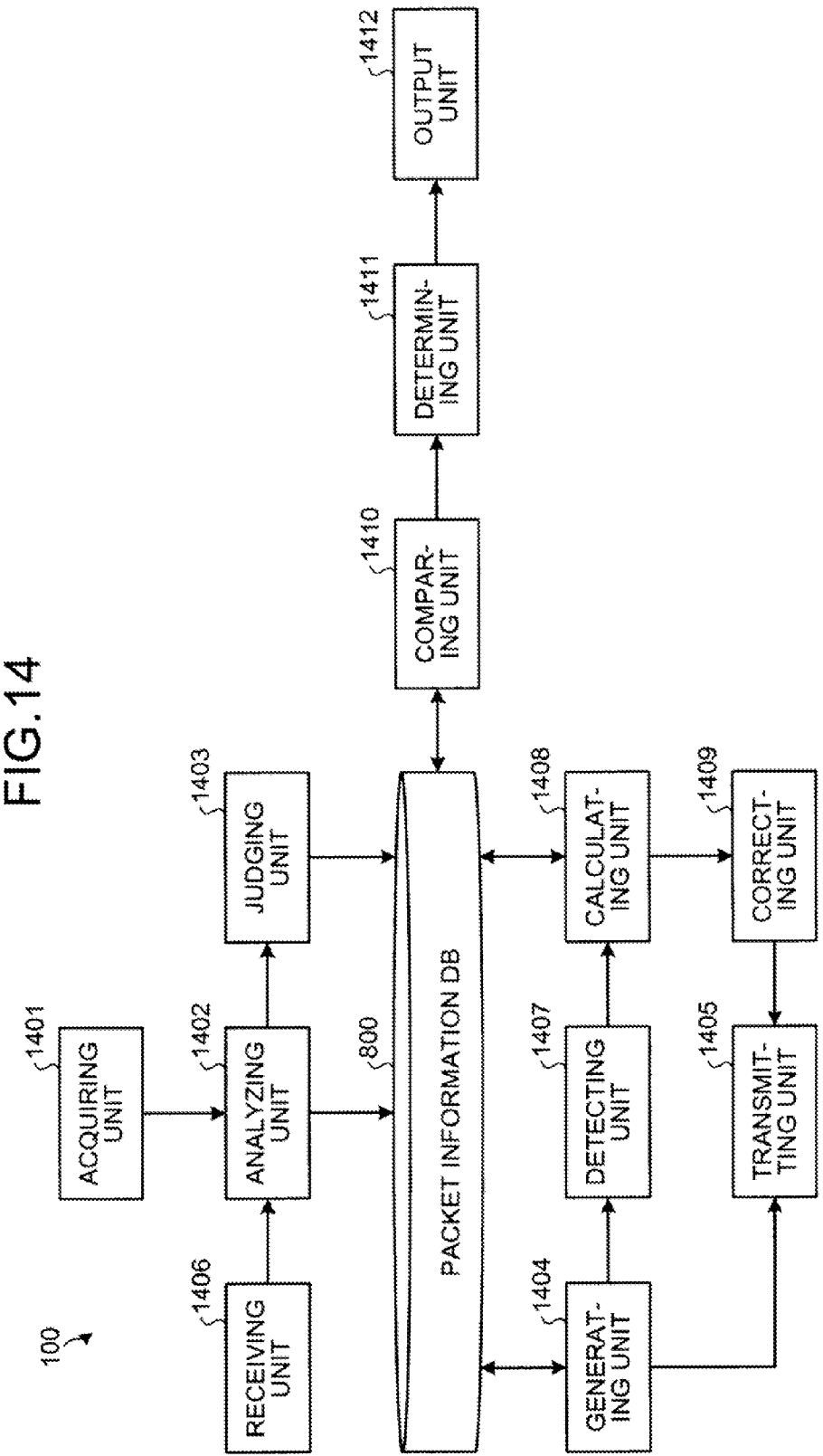
FIG. 14 is a block diagram of a functional configuration of a testing apparatus according to the embodiment.

FIG. 14 is a block diagram of a functional configuration of the testing apparatus 100. As depicted in FIG. 14, the testing apparatus 100 includes an acquiring unit 1401, an analyzing unit 1402, a judging unit 1403, a generating unit 1404, a transmitting unit 1405, a receiving unit 1406, a detecting unit 1407, a calculating unit 1408, a correcting unit 1409, a comparing unit 1410, a determining unit 1411, and an output unit 1412.

Functions of the acquiring unit 1401 to output unit 1412 are, for example, implemented by executing, on the CPU 701, a program stored in a storage device such as the ROM 702, the RAM 703, the magnetic disk 705, and the optical disk 707 depicted in FIG. 7, or by the I/F 709.

The acquiring unit 1401 acquires packets on a network. For example, the acquiring unit 1401 takes in packets captured by a tap connected to or built-in the testing apparatus 100. For instance, with respect to the examples depicted in FIGS. 1 to 5, the acquiring unit 1401 acquires packets S1A to S4A and R1A to R4A on the network Na.

The analyzing unit 1402 analyzes the packets acquired by the acquiring unit 1401. For example, the analyzing unit 1402 analyzes the acquired packets and writes the analysis information into the packet information DB 800.

The judging unit 1403, based on the analysis results obtained by the analyzing unit 1402 and for each transmission packet, judges whether the packet is a designated packet requiring an acknowledgment packet from the main system server A. For example, the judging unit 1403 judges whether the acknowledgment packet for the preceding packet of a given transmission packet is a SYN/ACK packet for 3-way handshake and whether the acknowledgment packet for the preceding packet of the given transmission packet has embedded cookie information.

Upon judging that the acknowledgment packet is a SYN/ACK packet and/or has embedded cookie information, the judging unit 1403 sets the wait time flag column To "1" in the record for the transmission packet. For example, as depicted in FIG. 8, the wait flags in records r2 and r12 for acknowledgment packets are set to "1".

The generating unit 1404 converts the record for the transmission packet transmitted to the main system server A to a record for a transmission packet to be transmitted to the standby system server B and thereby generates the transmission packet to the standby system server B. For example, in the packet information DB 800, by executing rewriting such as that depicted in FIG. 9, a transmission packet to be transmitted to the standby system server B is generated.

The transmitting unit 1405 transmits to the standby system server B, the transmission packet generated by the generating unit 1404. For example, for transmission packets generated by the generating unit 1404 and having a wait flag of "0", the transmitting unit 1405 transmits the transmission packets to the standby system server B according to the transmission time interval for transmission to the main system server A.

On the other hand, for transmission packets having a wait flag of "1", the transmitting unit 1405 transmits the transmission packets according to the transmission time interval written in the standby system column of the packet information DB 800. Further, for transmission packets that have been subject to time difference (delay) adjustment, even if the wait flag is "0", the transmitting unit 1405 transmits the transmission packets according to the transmission time interval written in the standby system column in the packet information DB 800.

In other words, if a transmission packet is judged to not be a designated packet by the judging unit 1403, the transmitting unit 1405 transmits the transmission packet according to the transmission time interval thereof. On the other hand, if a transmission packet is judged to be a designated packet by the judging unit 1403, the transmitting unit 1405 transmits the transmission packet after the reception of the acknowledgment packet for the preceding packet, even if the timing according to the transmission time interval thereof has been exceeded.

The receiving unit 1406 has a function of receiving acknowledgment packets from the standby system server B. An acknowledgment packet received by the receiving unit 1406 is analyzed by the analyzing unit 1402 and stored to the packet information DB 800.

The detecting unit 1407 detects transmission packets that have been transmitted to the standby system server B after the elapse of a transmission time interval that is longer than that for transmission to the main system server A. For example, the detecting unit 1407 detects a transmission packet that is not transmitted when the time of the transmission time interval indicated in the main system column of the packet information DB 800 elapses, but rather is transmitted thereafter. For example, the detecting unit 1407 detects transmission packets of records r3 and r13 depicted in FIGS. 10 to 13.

The calculating unit 1408 calculates the wait time for the transmission of a transmission packet. For example, by subtracting the elapsed time for the preceding packet from the time that elapses between the start of the test until a given transmission packet is transmitted, the time interval from the preceding packet is obtained and written into the standby system column. The calculating unit 1408 subtracts the time interval indicated in the main system column from the time interval written in the standby system column to calculate the wait time and writes the calculated wait time into the wait time column.

If waiting has occurred, from among a group of subsequent transmission packets, the correcting unit 1409 selects a transmission packet having a wait flag of "0" and subtracts the wait time from the transmission time interval for transmitting the selected packet, to correct for the delay. For example, the correction depicted in FIGS. 3 to 5 is performed. The corrected time interval is written into the standby column for the selected transmission packet.

In other words, if the transmission time interval (transmission time interval for transmission to the standby system server B) between the transmission of the packet preceding a designated packet and the transmission of the designated packet exceeds the transmission time intervals (transmission time interval for transmission to the main system server A) of 2 packets corresponding to the preceding packet and the designated packet, the correcting unit 1409 corrects the transmission time interval (transmission time interval for transmission to the standby system server B) between the designated packet and the packet transmitted subsequent to the designated packet, to be shorter than the transmission time intervals (transmission time interval for transmission to the main system server A) of the 2 packets corresponding to the designated packet and the subsequent packet.

The comparing unit 1410 compares the transmission time interval diB of a specified transmission packet SiB (where, i≠1) and the transmission time interval DiB of the acknowledgment packet RiB therefor. Although an arbitrary transmission packet SiB may be specified, a transmission packet SiB that is not affected by wait time is preferable. A transmission packet that is not affected by wait time is, for example, a transmission packet having a wait flag that is not "ON" and/or a transmission packet having a time interval that is not shortened by the wait time.

Thus, by specifying a transmission packet SiB that is not affected by wait time, such a packet is transmitted at the same time interval as transmission to the main system server A, enabling transmission to the main system server A to be faithfully reproduced with respect to the standby system server B as well. Consequently, performance can be evaluated with a high degree of accuracy.

The determining unit 1411, based on the comparison result obtained by the comparing unit 1410, determines the relative performance of the compared apparatuses. For example, if diB<DiB is true, the determining unit 1411 determines the performance of the main system server A to be better that that of the standby system server B and writes the determination result to memory. If diB=DiB is true, the determining unit 1411 determines the performance of the main system server A and that of the standby system server B to be equivalent and writes the determination result to memory. If diB>DiB is true, the testing apparatus 100 determines the performance of the standby system server B to be better than that of the main system server A and writes the determination result to memory.

The output unit 1412 outputs the determination result obtained by the determining unit 1411. For example, the output unit 1412 displays the determination result on the display 708, prints out the determination result at the printer 713 and/or transmits the determination result to an external device.

A testing procedure by the testing apparatus 100 will be described using FIGS. 15 to 21.

Figure 15:
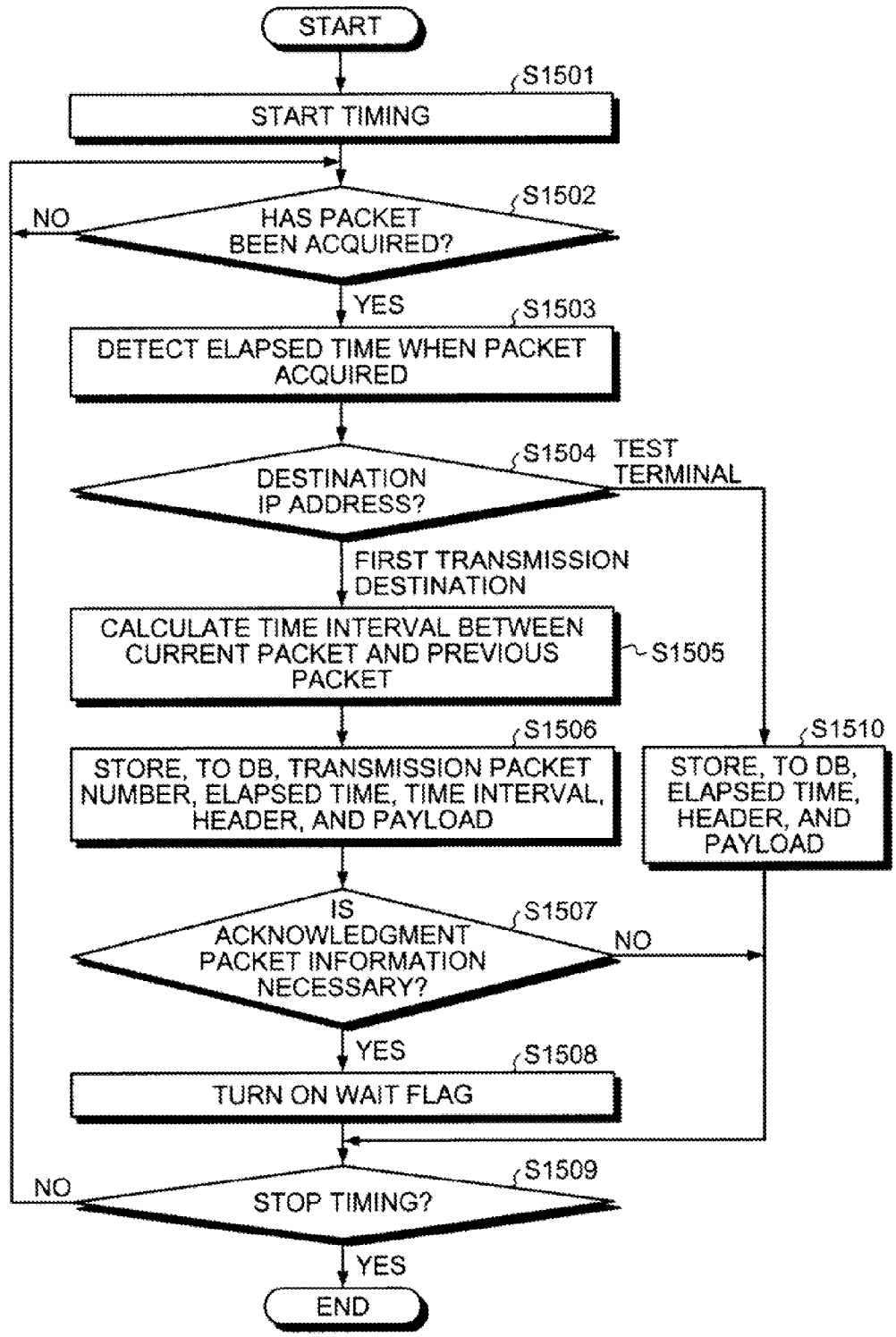
FIG. 15 is a flowchart of a process of acquiring a packet communicated between a testing terminal C and a main system server A.

FIG. 15 is a flowchart of a process of acquiring a packet communicated between the testing terminal C and the main system server A. As depicted in FIG. 15, the testing apparatus 100 starts timing upon receiving test start input (step S1501) and waiting occurs until a packet is acquired (captured) (step S1502: NO). When a packet is acquired (step S1502: YES), the testing apparatus 100 detects the time that has elapsed from the start of timing until the packet is acquired (step S1503). The testing apparatus 100 confirms the destination IP address described in the header of the acquired packet (step S1504).

If the destination IP address is the IP address of the main system server A (step S1504: first transmission destination), the acquired packet is a transmission packet from the testing terminal C to the main system server A. In this case, the testing apparatus 100 calculates the time interval from the transmission of the transmission packet transmitted to the main system server A, 1-packet before (step S1505). For example, the testing apparatus 100 subtracts the elapsed time of the transmission packet transmitted 1-packet before from the elapsed time when the transmission packet is acquired, to calculate the time interval from the transmission of the transmission packet to the main system server A, 1-packet before.

Thereafter, the testing apparatus 100 sets a new record and transmission packet number in the packet information DB 800 and stores the transmission packet number, the elapsed time detected at step S1503, the time interval calculated at step S1505, a header, and payload (step S1506).

The testing apparatus 100, using the judging unit 1403, judges whether the information of the acknowledgment packet for the transmission packet 1-packet before is necessary (step S1507). If the information is determined to be necessary (step S1507: YES), the testing apparatus 100 sets the wait flag to "ON" (1) (step S1508) and judges whether to stop timing (step S1509).

At step S1507, if the information of the acknowledgment packet is determined to be not necessary (step S1507: NO), the wait flag is left "OFF" (0) and the flow proceeds to step S1509.

At step S1504, if the destination IP address is the IP address of the testing terminal C (step S1504: test terminal), the testing apparatus 100 sets a new record in the packet information DB 800 and stores the elapsed time detected at step S1503, a header, and payload (step S1510); and proceeds to step S1509.

At step S1509, the testing apparatus 100 judges whether to stop timing (step S1509). If the testing apparatus 100 judges to not stop timing (step S1509: NO), the testing apparatus 100 returns to step S1502 whereas if the testing apparatus 100 judges to stop timing (step S1509: YES), packet acquisition processing ends.

Thus, the packet acquisition processing depicted in FIG. 15 is executed by the testing apparatus 100, whereby, records r1 to r3 and r11 to r18 become set in the packet information DB 800, as depicted in FIG. 8.

Transmission packet conversion processing will be described. Transmission packet conversion processing is processing of converting the destination of a transmission packet that is stored according the procedure depicted in FIG. 15, in the packet information DB 800 depicted in FIG. 8.

Figure 16:
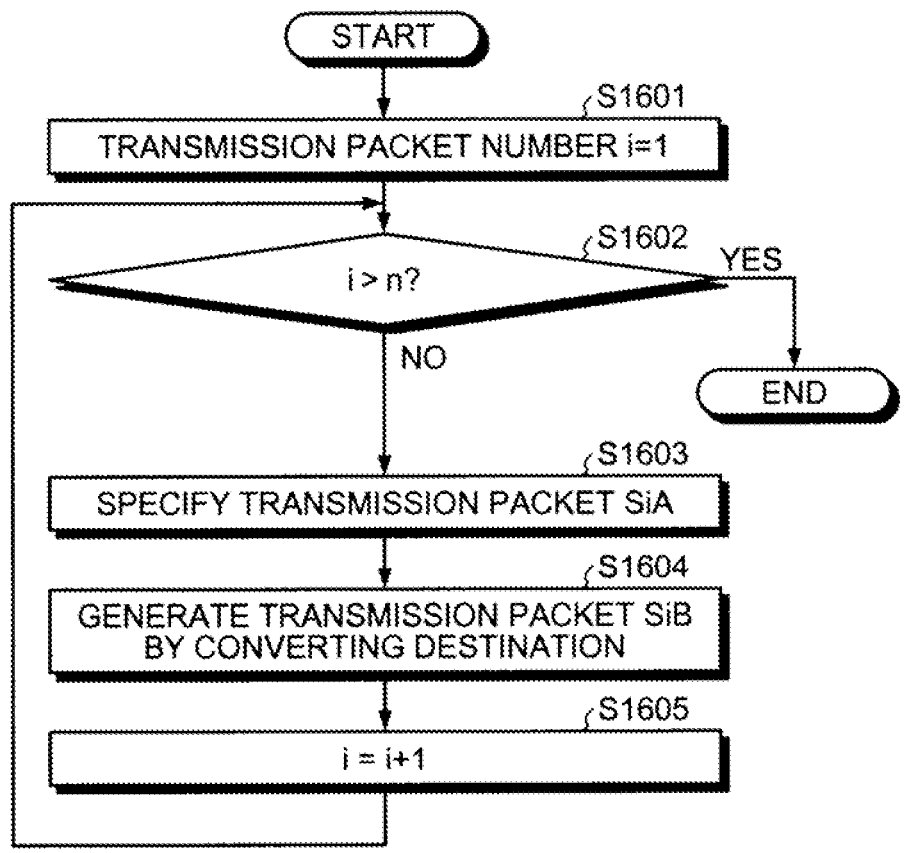
FIG. 16 is a flowchart of a transmission packet conversion procedure.

FIG. 16 is a flowchart of a transmission packet conversion procedure. Transmission packet conversion processing is performed according to session ID. The testing apparatus 100 sets the transmission packet number i to 1 (step S1601) and judges whether i>n is true (step S1602). n is the transmission packet count for a given session ID.

If i>n is not true (step S1602: NO), the testing apparatus 100 specifies the record of a transmission packet SiA (step S1603) and converts the destination to the IP address of the standby system server B to generate a transmission packet SiB (step S1604). The transmission source is also converted from the IP address of the testing terminal C to the IP address of the testing apparatus 100. As necessary, the sequence number and the acknowledgment number amongst the TCP header information are also converted.

The testing apparatus 100 increments i (step S1605), and returns to step S1602. At step S1602, if i>n is true (step S1602: YES), the testing apparatus 100 terminates the transmission packet conversion processing for the current session ID.

Thus, by the transmission packet conversion processing depicted in FIG. 16 and executed by the testing apparatus 100, records r1, r3, r11, r13, r15, and r17 for the transmission packets for which the destinations have been converted are set in the packet information DB 800 as depicted in FIG. 9. The records r2, r12, r14, r16, and r18 for the acknowledgment packets are deleted.

Figure 17:
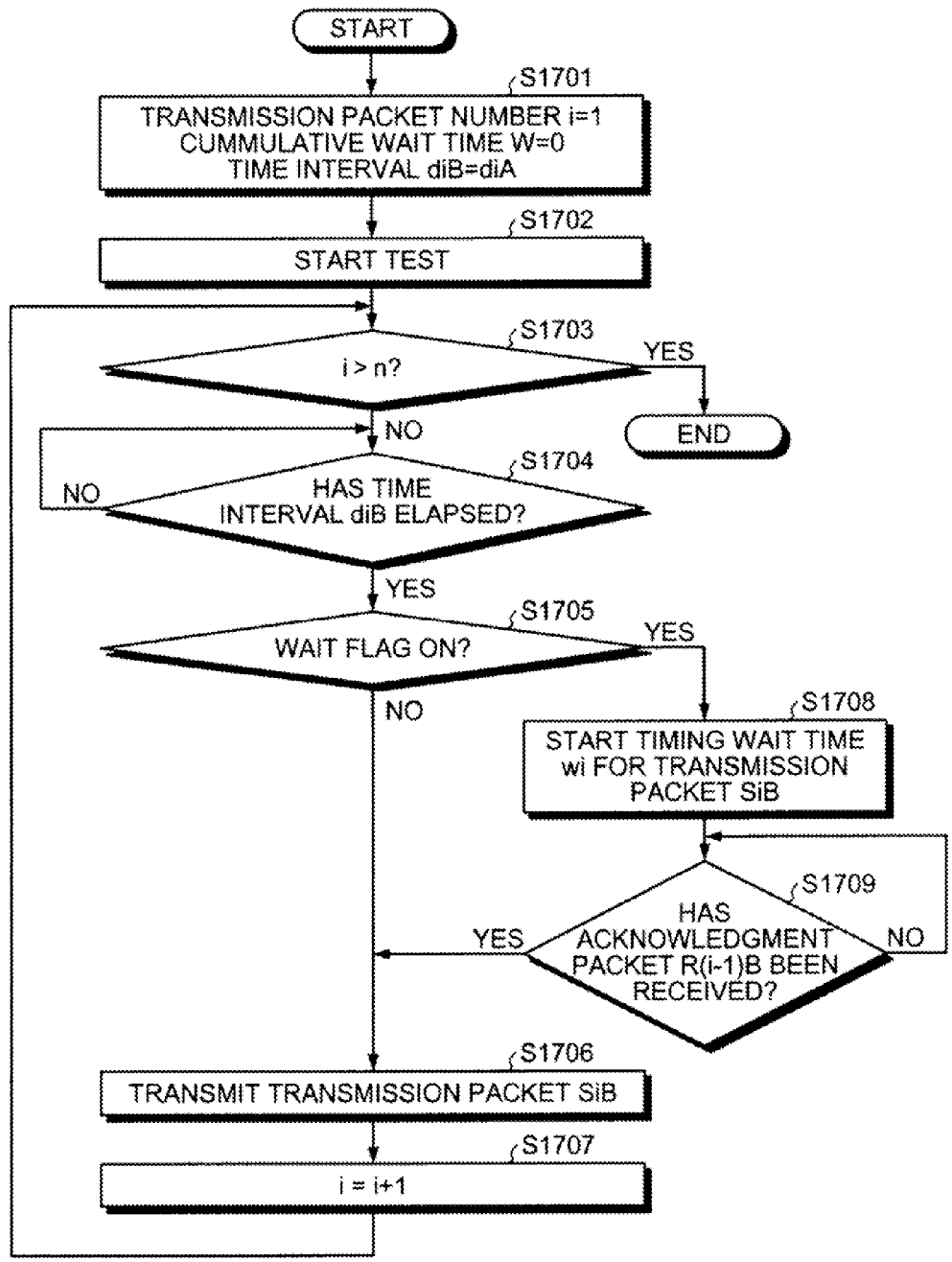
FIG. 17 is a flowchart of a procedure of packet transmission to a standby system server B.

FIG. 17 is a flowchart of a procedure of packet transmission to the standby system server B. In the example depicted in FIG. 17, the state of the packet information DB 800 depicted in FIG. 9 is used. The testing apparatus 100 sets the transmission packet number i as 1, the cumulative wait time W as 0, and the transmission time interval diB for transmission to the standby system server B as diA (step S1701). diA is the time interval when the transmission packet SiA (before destination conversion) is transmitted to the main system server A.

The testing apparatus 100 starts the test (starts timing) (step S1702), and judges whether i>n is true (step S1703). If i>n is not true (step S1703: NO), the testing apparatus 100 judges whether a time period equivalent to the transmission time interval diB has elapsed since the transmission of the transmission packet S(i−1)B (1-packet before) (if i=1, the start of timing) (step S1704). Here, concerning the transmission time interval diB, which is used as a reference, since the initial setting at step S1701 is typically such that the transmission time interval diB=diA, the testing apparatus 100 judges whether a time period equivalent to the transmission time interval diB=diA has elapsed. On the other hand, in FIGS. 18 and 19, if the transmission time interval diB=diA has been changed, the transmission time interval diB (resulting from the change) is used.

At step S1704, the testing apparatus 100 waits for the time period equivalent to the transmission time interval diB to elapse (step S1704: NO). When the time period equivalent to the transmission time interval diB has elapsed (step S1704: YES), the testing apparatus 100 judges from the record for the transmission packet SiB in the packet information DB 800, whether the wait flag of the transmission packet SiB is "ON" (1) (step S1705). If the wait flag is not "ON" (step S1705: NO), waiting is not necessary and consequently, the testing apparatus 100 transmits the transmission packet SiB at the elapse of the time period equivalent to the transmission time interval diB (step S1706), increments i (step S1707), and returns to step S1703.

On the other hand, if the wait flag is "ON" (step S1705: YES), when the time period equivalent to the transmission time interval diB has elapsed, timing of the wait time wi of the transmission packet SiB is started (step S1708). The wait time wi is an independent wait time for a given transmission packet SiB. The updating of the cumulative wait time W is described with reference to FIGS. 18 and 19.

After the timing of the wait period wi starts, the testing apparatus 100 awaits reception of the acknowledgment packet R(i−1)B for the transmission packet S(i−1)B, 1-packet before (step S1709: NO). When acknowledgment packet R(i−1)B is received (step S1709: YES), the testing apparatus 100 proceeds to step S1706 and transmits the transmission packet SiB to the standby system server B (step S1706). At step S1703, if i>n is true (step S1703: YES), the testing apparatus 100 terminates the processing for transmitting a packet to the standby system server B.

Figure 18:
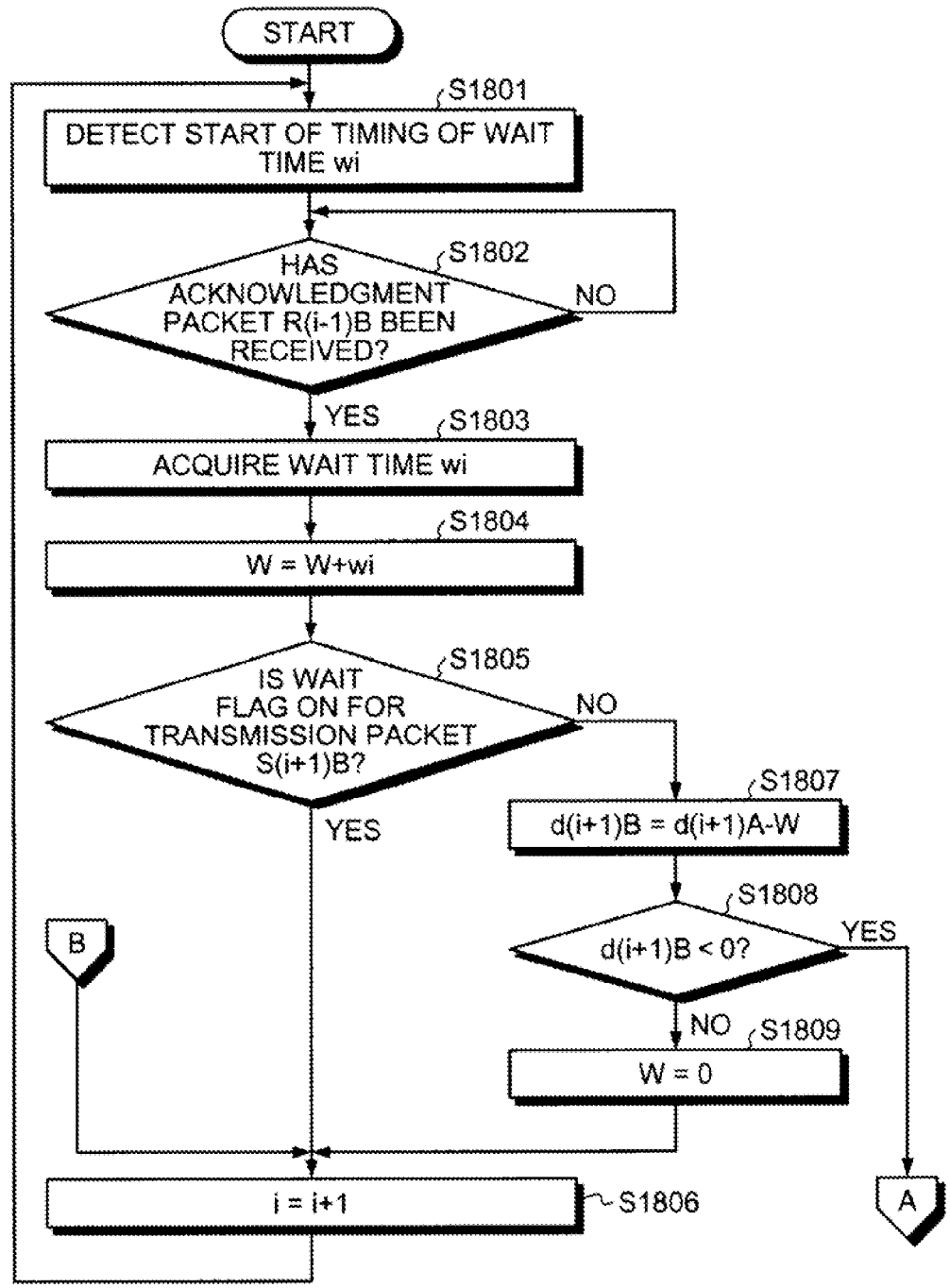
FIGS. 18 and 19 are flowcharts of a procedure of calculating a transmission time interval d(i+1)B for transmitting a subsequent packet (transmission packet S(i+1)B).
Figure 19:
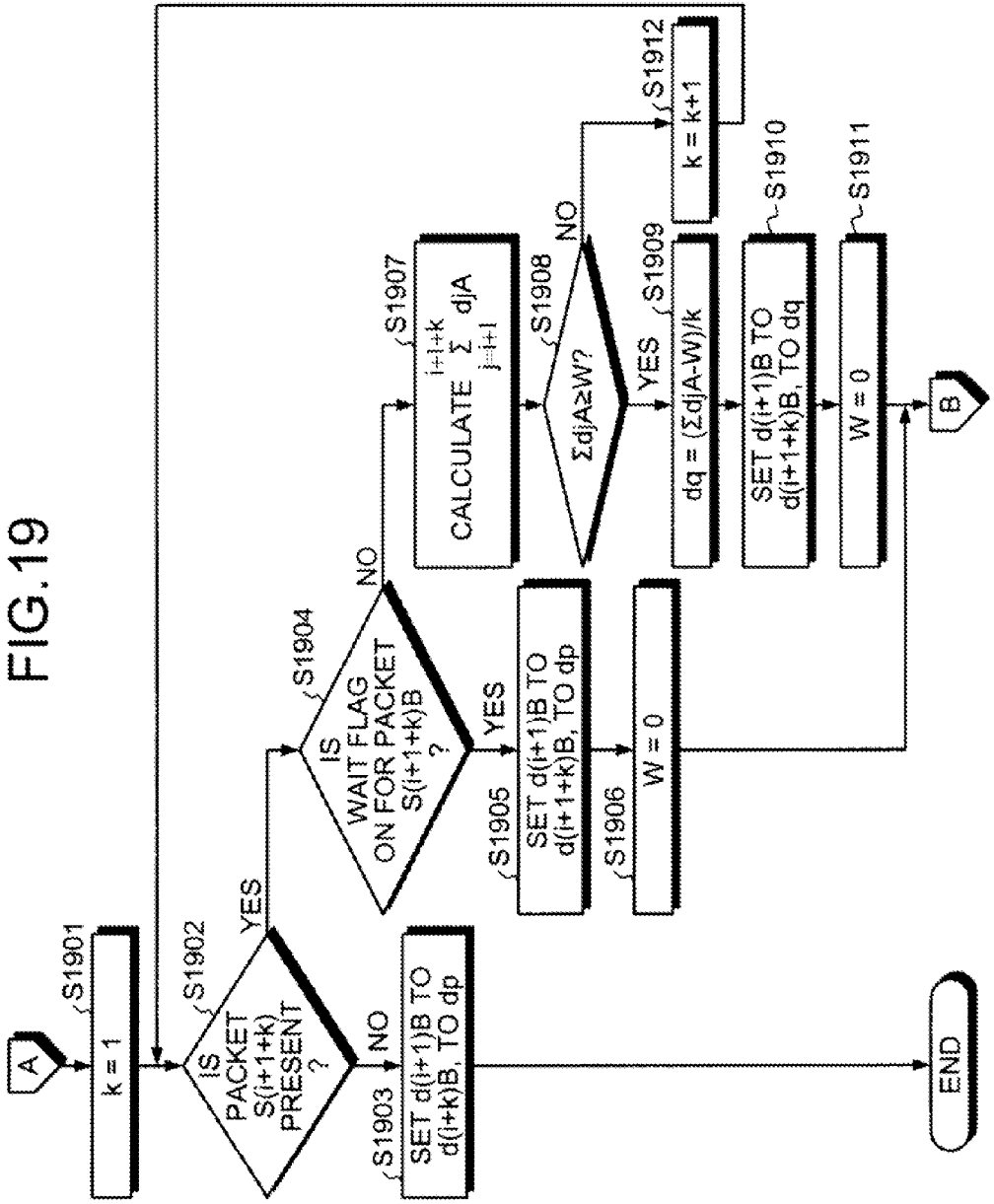

FIGS. 18 and 19 are flowcharts of a procedure of calculating the transmission time interval d(i+1)B for transmitting the subsequent packet (transmission packet S(i+1)B). As depicted in FIG. 18, upon detecting the start of the timing of the wait time wi at step S1708 in FIG. 17 (step S1801), the testing apparatus 100 awaits the reception of the acknowledgment packet R(i−1)B (step S1802: NO), and when the acknowledgment packet R(i−1)B has been received (step S1802: YES), the testing apparatus 100 acquires the wait time wi from the start of the timing of the wait time wi until the reception of the acknowledgment packet R(−1)B (step S1803).

The testing apparatus 100 adds the acquired wait time wi to the cumulative wait time W (step S1804). Since the initial value of the cumulative wait time W is 0 (step S1701), when the first wait time wi is acquired, the cumulative wait time W equals wi.

From the record for the transmission packet S(i+1)B in the packet information DB 800, the testing apparatus 100 judges whether the wait flag for the transmission packet S(i+1)B, which is to be transmitted next, is "ON" (1) (step S1805). If the wait flag is "ON" (step S1805: YES), the testing apparatus 100 increments i (step S1806) and returns to step S1801.

On the other hand, if the wait flag is "OFF" (step S1805: NO), the testing apparatus 100 updates the transmission time interval d(i+1)B for the transmission packet S(i+1)B, to the difference of the transmission time interval d(i+1)A less the cumulative wait time W (step S1807). The testing apparatus 100 judges whether the updated transmission time interval d(i+1)B is less than 0 (step S1808).

If d(i+1)B<0 is not true (step S1808: NO), the testing apparatus 100 assumes the cumulative wait time W to be 0 (step S1809) and proceeds to step S1806. By incrementing i at step S1707 in FIG. 17, the transmission packet S(i+1)B, which is to be transmitted next, is transmitted at the elapse of a time period equivalent to the updated transmission time interval d(i+1)B.

At step S1808, if d(i+1)B<0 is true (step S1808: YES), the transmission packet S(i+1)B is to be transmitted before the transmission packet SiB currently subject to processing and consequently, further correction is performed as depicted in FIG. 19.

In FIG. 19, after step S1808: YES, k=1 is assumed (step S1901). k is the transmission packet count of the transmission packets subsequent to the transmission packet S(i+1)B. The testing apparatus 100 judges whether a transmission packet S(i+1+k)B is present (step S1902). If a transmission packet S(i+1+k)B is not present (step S1902: NO), the testing apparatus 100 sets each of the transmission time intervals d(i+1)B to d(i+k)B for the transmitting transmission packets S(i+1)B to S(i+k)B to a given transmission time interval $dp(\geq 0)$ (step S1903). In other words, since the transmission time intervals d(i+1)B to d(i+k)B become negative values, given transmission time intervals $dp(\geq 0)$ are forcibly set, ending the processing.

On the other hand, at step S1902, if a transmission packet S(i+1+k)B is present (step S1902: YES), the testing apparatus 100 judges from the record for transmission packet S(i+1+k)B in the packet information DB 800, whether the wait flag for transmission packet S(i+1+k)B is "ON" (step S1904).

If the wait flag is "ON" (step S1904: YES), the testing apparatus 100 sets each of the transmission time intervals d(i+1)B to d(i+1+k)B for transmitting the transmission packets S(i+1)B to S(i+1+k)B, to a given transmission time interval $dp(\geq 0)$ (step S1905), assumes the cumulative wait time W to be 0 (step S1906), and returns to step S1806. In other words, since the transmission time intervals d(i+1)B to d(i+1+k)B become negative values, the given transmission time intervals $dp (\geq 0)$ are forcibly set.

At step S1904, if the wait flag is "OFF" (step S1904: NO), the testing apparatus 100 reads out from the packet information DB 800, the transmission time intervals d(i+1)A to d(i+1+k)A of the transmission packets S(i+1)A to S(i+1+k)A (before destination conversion) and calculates the sum ΣdjA of the transmission time intervals d(i+1)A to d(i+1+k)A (step S1907). The testing apparatus 100 judges whether the sum ΣdjA is ΣdjA≧W (step S1908).

If ΣdjA≧W is not true (step S1908: NO), the cumulative wait time W cannot be distributed among transmission packets S(i+1)B to S(i+1+k)B and consequently, the testing apparatus 100 increments k (step S1912) and returns to step S1902.

On the other hand, if $\Sigma djA \geqq W$ is true (step S1908: YES), the testing apparatus 100 subtracts the cumulative wait time W from the sum $\Sigma djA$ and divides the difference by k to calculate a transmission time interval dq (step S1909). The testing apparatus 100 respectively sets the transmission time intervals d(i+1)B to d(i+1+k)B for transmitting transmission packets S(i+1)B to S(i+1+k)B, to the transmission time interval dq (step S1910). Consequently, the cumulative wait time W for the transmission packets S(i+1)B to S(i+1+k)B can be equalized, whereby concentrated transmission packet reception causing excess load at the standby system server B can be prevented.

Subsequently, the testing apparatus 100 assumes the cumulative wait time W as 0 (step S1911) and returns to step S1806. Thus, at steps S1807, S1903, S1905 and S1911, by updating the time interval for transmitting the transmission packet from the initial setting diA, the updated time interval can be used as the transmission time interval diB at step S1704, enabling realization of the processing for transmission to the standby system server B depicted in FIGS. 3 to 5.

Figure 20:
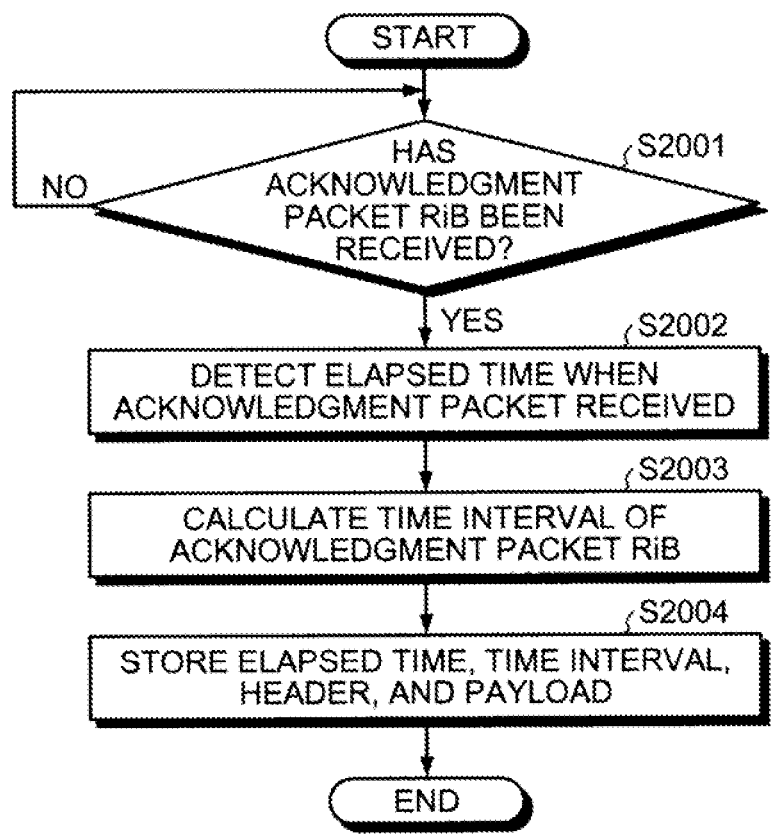
FIG. 20 is a flowchart of acknowledgment packet storage processing.

FIG. 20 is a flowchart of acknowledgment packet storage processing. To transmit the transmission packet SiB to the standby system server B, the testing apparatus 100 awaits reception of an acknowledgment packet RiB from the standby system server B (step S2001: NO). When the acknowledgment packet RiB is received (step S2001: YES), the testing apparatus 100 detects the time that elapses from the start of the test (step S1702) until the reception of the acknowledgment packet RiB (step S2002).

The testing apparatus 100 calculates the transmission time interval DiB from the reception of the acknowledgment packet R(i−1)B, 1-packet before (if i=1, from the start of the test), until the reception of the acknowledgment packet RiB (step S2003). The testing apparatus 100 sets a new record and stores the elapsed time detected at step S2002, the transmission time interval diB calculated at step S2003, as well as the header and the payload of the acknowledgment packet RiB (step S2004), ending the storage processing. By this storage processing, records r2, r12, r14, r16, and r18 for the acknowledgment packets are stored as depicted in FIG. 13.

Figure 21:
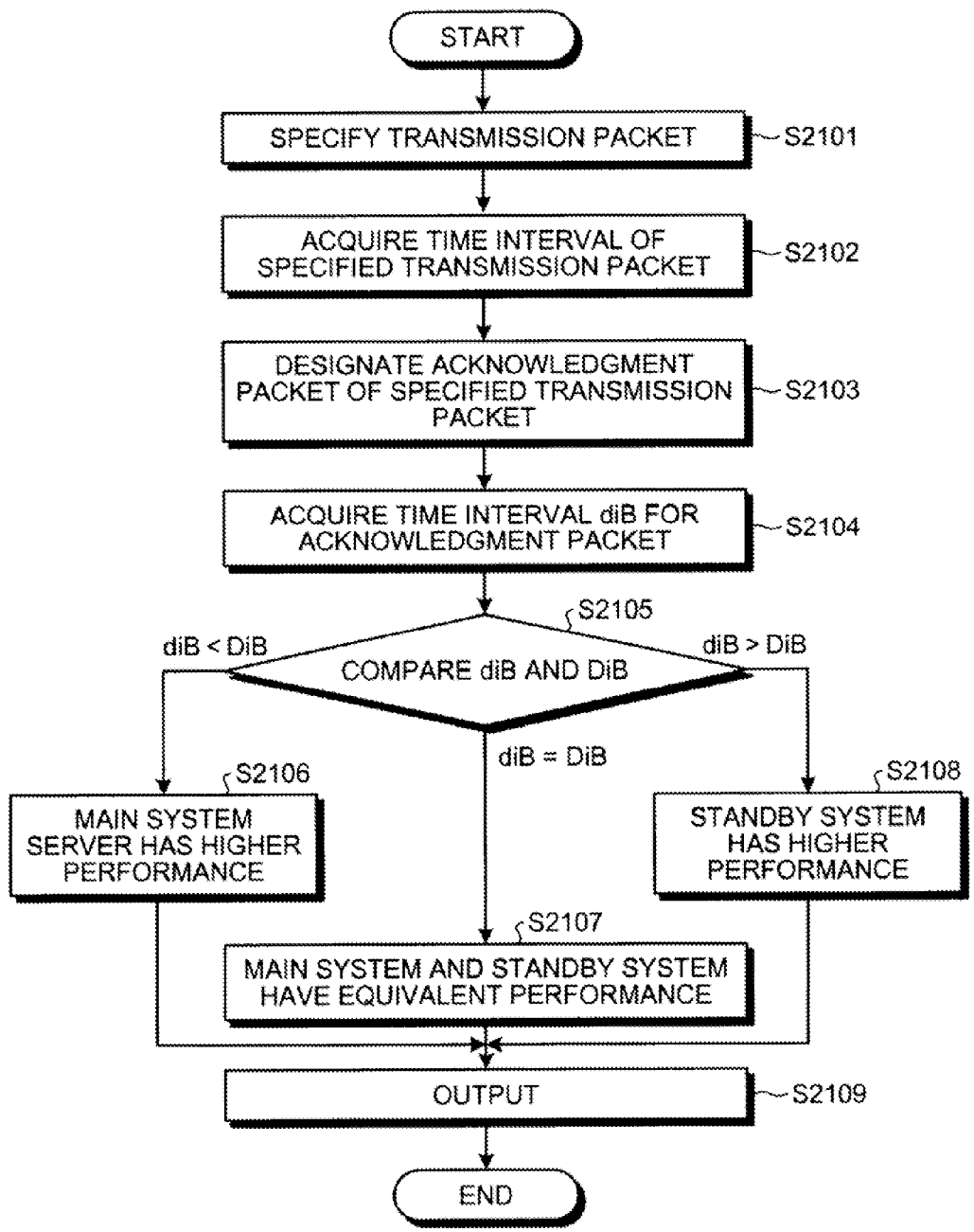
FIG. 21 is a flowchart of performance evaluation processing.
Figure 22:
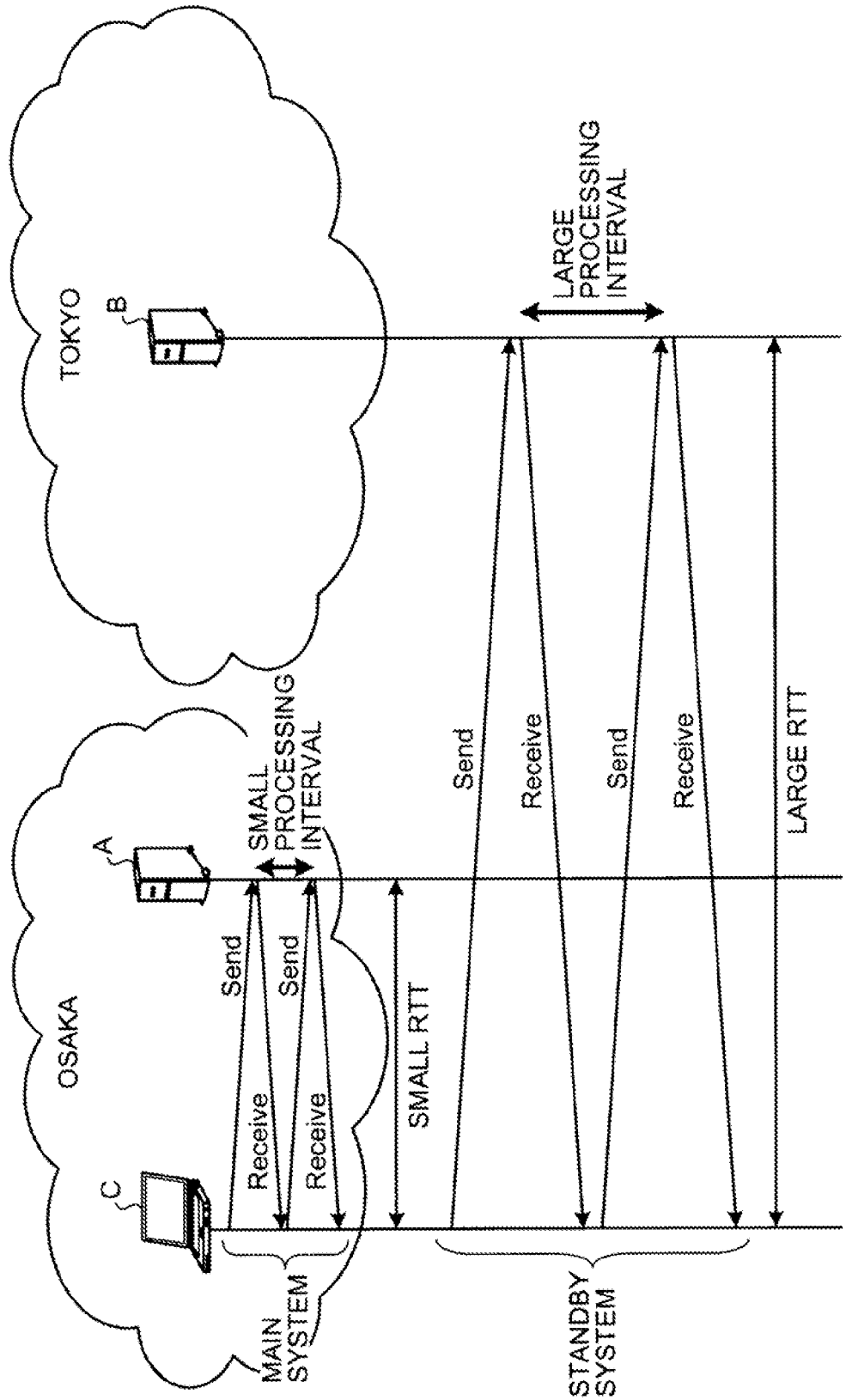
FIG. 22 depicts an example of relative performance evaluation processing for a main system server and a standby system server.

FIG. 21 is a flowchart of performance evaluation processing. The testing apparatus 100 specifies from the packet information DB 800, a record of an arbitrary transmission packet SiB (where, i≠1) (step S2101) and acquires from the packet information DB 800, the transmission time interval diB for the specified transmission packet SiB (step S2102).

The testing apparatus 100 specifies the acknowledgment packet RiB for the specified transmission packet SiB, from TCP header information in the packet information DB 800 (step S2103) and acquires the transmission time interval DiB for the specified acknowledgment packet RiB (step S2104). The testing apparatus 100 compares the transmission time interval diB and the transmission time interval DiB (step S2105).

If diB<DiB is true (step S2105: diB<DiB), the testing apparatus 100 determines that the performance of the main system server A is better than that of the standby system server B and writes the determination result to the memory (step S2106). If diB=DiB is true (step S2105: diB=DiB), the testing apparatus 100 determines that the performance of the main system server A and that of the standby system server B are equivalent and writes the determination result to the memory (step S2107).

If diB>DiB is true (step S2105: diB>DiB), the testing apparatus 100 determines that the performance of the standby system server B is better than that of the main system server A and writes the determination result to the memory (step S2108). Subsequently, the testing apparatus 100 outputs the determination result written in the memory (step S2109).

In the example depicted in FIG. 21, although an arbitrary transmission packet SiB is specified, a transmission packet SiB for which the wait flag is not "ON", a transmission packet SiB for which the transmission time interval diB for transmission to the standby system server B and the transmission time interval diA for transmission to the main system server A are equivalent (diB=diA) are preferable. Such a transmission packet SiB is not affected by wait time and consequently, compared to a transmission packet SiB that is affected by wait time, more accurate performance evaluation can be performed.

As described, according to the embodiment, the destination of a packet destined to a first transmission destination (for example, the main system server A) is changed to a second transmission destination (for example, the standby system server B) and the packet is transmitted to the second transmission destination, at a time interval equivalent to that of the first transmission destination, whereby the distance to the second transmission destination appears equivalent to the communication distance of the first transmission destination, enabling testing that reproduces the same load.

Further, if the information of the acknowledgment packet for the transmission packet 1-packet before is necessary, the transmission of the transmission packet is postponed until the reception of the acknowledgment packet, whereby the sum of the time intervals for the second transmission destination may become greater than the sum of the time intervals for the first transmission destination, making testing that reproduces the same load impossible.

Nonetheless, even in this case, the wait time is measured and subtracted from the time interval of the subsequent transmission packet, whereby the sum of the time intervals for the first transmission destination and the sum of the time intervals for the second transmission destination can become equivalent. Therefore, even in this case, the distance to the second transmission destination appears equivalent to the communication distance of the first transmission destination, enabling testing that reproduces the same load.

Further, if waiting occurs, the waiting time is distributed among the time intervals of subsequent transmission packets, such that the time intervals of the transmission packets do not become too close. As a result, concentrated reception of the subsequent transmission packets at short periods at the second transmission destination can be prevented, enabling excess load at the second transmission destination to be prevented.

If a series of packets including and subsequent to the subsequent packet cannot absorb the wait time, the time intervals for the series of packets is set to a given value of 0 or more. Consequently, the difference between the sum of the intervals for the first transmission destination and the sum of the intervals for the second transmission destination can be suppressed as much as possible, enabling deterioration of the performance evaluation to be prevented. Further, if the sum of the time intervals for the second transmission destination is less that that of the first transmission destination, the testing and evaluation of the second transmission destination can be performed in less time.

Even if consecutive transmission packets have wait flags that are "ON", by obtaining the sum of the wait times for each of the transmission packets, offsetting by the time intervals of subsequent transmission packets is enabled.

In the embodiment, the transmission sequence of the transmission packets is preserved and if the sum of the time intervals for the first transmission destination and the sum of the time intervals for the second transmission destination can be made equivalent, the time interval of any subsequent transmission packet may be corrected. For example, in the example depicted in FIG. 3, although the time interval of the transmission packet S3B, which is subsequent to the transmission packet S2B for which the wait flag is "ON", is corrected, the time interval of the subsequent packet (transmission packet S4B) may be corrected.

Consequently, the embodiment enables highly accurate testing and performance evaluation to be performed efficiently.

Figure 23:
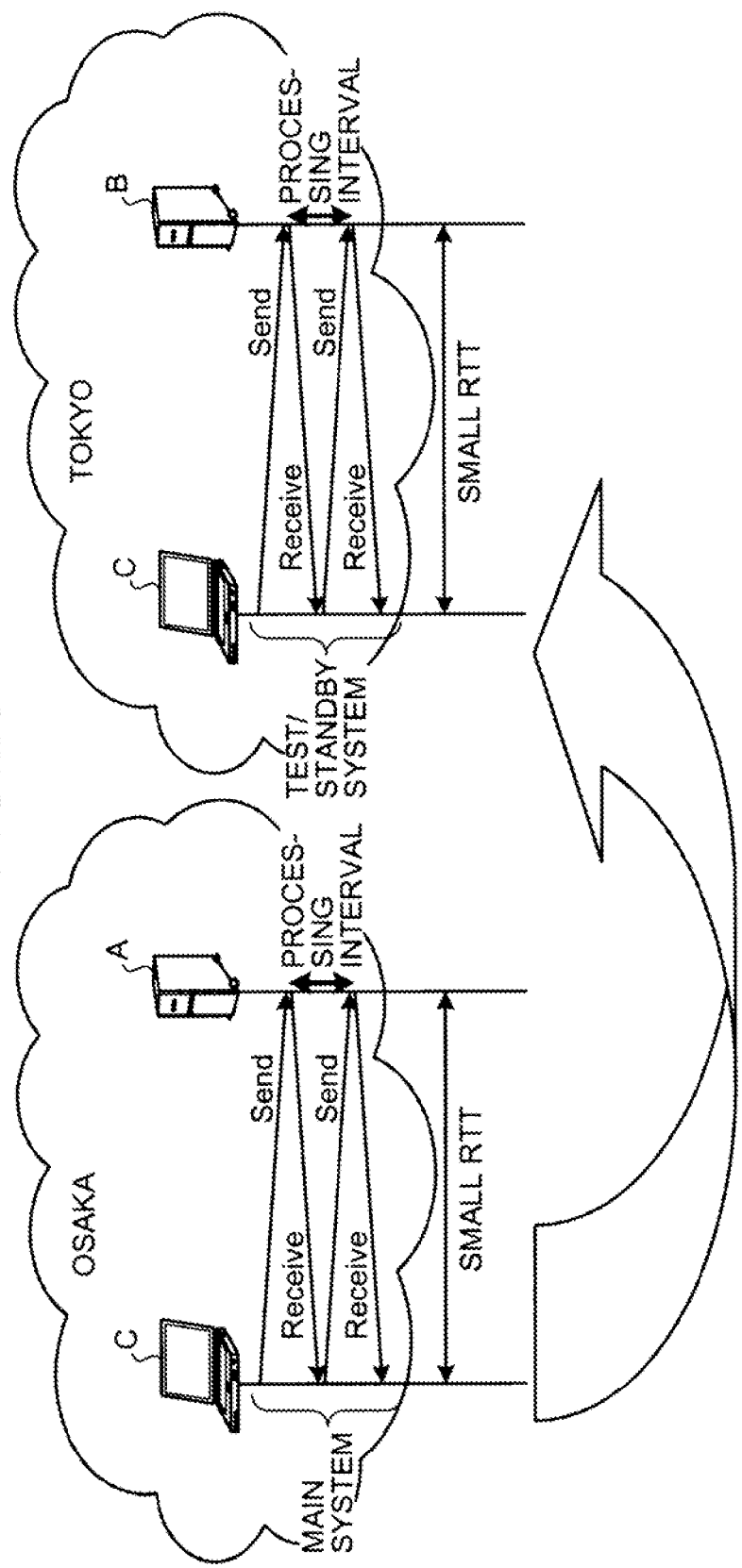
FIG. 23 depicts another example of relative performance evaluation processing for a conventional main system server and a standby system server.

In the example depicted in FIG. 23, to test using equivalent loads as depicted in FIG. 2, the test conductor captures the packet sequence with respect to the main system server A and then goes to the site (Tokyo) where the standby system server B is located, and transmits packets in the same sequence based on the captured data. Consequently, the labor involved, such as for the travel of the test conductor, places a great burden on the test conductor. However, according to the embodiment, the test conductor is able to implement high quality testing without traveling, enabling a reduction in the load placed on the test conductor.

The testing method described in the present embodiment may be implemented by executing a prepared program on a computer such as a personal computer and a workstation. The program is stored on a computer-readable, non-transitory medium such as a hard disk, a flexible disk, a CD-ROM, an MO, and a DVD, read out from the recording medium, and executed by the computer. The program may be a transmission medium that can be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer-readable, non-transitory medium storing therein a testing program that causes a computer to execute a procedure, the procedure comprising:

acquiring a transmission time interval for a plurality of packets sequentially transmitted from a first transmission source to a first transmission destination;

judging, when the packets whose destination has been changed to a second transmission destination are sequentially transmitted, from a second transmission source, according to the acquired transmission time interval, whether a given packet to be transmitted is a designated packet requiring reception of an acknowledgment packet transmitted from the second transmission destination for a preceding packet transmitted before the given packet;

transmitting the given packet after the reception of the acknowledgment packet for the preceding packet, even if transmission timing according to the transmission time interval has passed, if the given packet is judged to be a designated packet;

correcting, if a transmission time interval between transmission of the preceding packet and transmission of the designated packet exceeds transmission time intervals for 2 packets that correspond to the preceding packet and the designated packet and that are among the packets transmitted from the first transmission source to the first transmission destination, a transmission time interval between the designated packet and a subsequent packet transmitted subsequent to the designated packet, to be shorter than transmission intervals for 2 packets that correspond to the designated packet and the subsequent packet and that are among the packets transmitted from the first transmission source to the first transmission destination; and transmitting the subsequent packet from the second transmission source to the second transmission destination, at the corrected transmission time interval.

2. The computer-readable, non-transitory medium according to claim 1, the procedure further comprising transmitting the given packet to the second transmission destination at the transmission timing according to the transmission time interval, if the given packet is judged not to be a designated packet.

3. The computer-readable, non-transitory medium according to claim 1, wherein the correcting, if wait time, which is the difference of the transmission time interval between the transmission of the preceding packet and the transmission of the designated packet less the transmission time intervals of the 2 packets corresponding to the preceding packet and the designated packet, is equal to or greater than the transmission time intervals of the 2 packets corresponding to the designated packet and the subsequent packet, includes setting the transmission time interval between the designated packet and the subsequent packet to a given value.

4. The computer-readable, non-transitory medium according to claim 1, wherein the correcting includes correcting, based on wait time, each transmission time interval for packets subsequent to the 2 packets corresponding to the designated packet and the subsequent packet.

5. The computer-readable, non-transitory medium according to claim 1, the procedure further comprising:

comparing a transmission time interval for 2 consecutive packets transmitted to the second transmission destination and an acknowledgment time interval for 2 acknowledgment packets that are for the 2 consecutive packets and are from the second transmission destination;

determining relative performance of the first transmission destination and the second transmission destination, based on a comparison result obtained at the comparing; and outputting a determination result obtained at the determining.

6. A computer-readable, non-transitory medium storing therein a testing program that causes a computer to execute a procedure, the procedure comprising:

acquiring a transmission time interval for a plurality of packets sequentially transmitted from a transmission source to a first transmission destination;

judging, when the packets whose destination has been changed to a second transmission destination are sequentially transmitted, from the transmission source, according to the acquired transmission time interval, whether a given packet to be transmitted is a designated packet requiring reception of an acknowledgment packet transmitted from the second transmission destination for a preceding packet transmitted before the given packet;

transmitting the given packet after the reception of the acknowledgment packet for the preceding packet, even if transmission timing according to the transmission time interval has passed, if the given packet is judged to be a designated packet;

correcting, if a transmission time interval between transmission of the preceding packet and transmission of the designated packet exceeds transmission time intervals for 2 packets that correspond to the preceding packet and the designated packet and that are among the packets transmitted from the transmission source to the first transmission destination, a transmission time interval between the designated packet and a subsequent packet transmitted subsequent to the designated packet, to be shorter than transmission intervals for 2 packets that correspond to the designated packet and the subsequent packet and that are among the packets transmitted from the transmission source to the first transmission destination; and transmitting the subsequent packet from the transmission source to the second transmission destination, at the corrected transmission time interval.

7. The computer-readable, non-transitory medium according to claim 6, the procedure further comprising
transmitting the given packet to the second transmission destination at the transmission timing according to the transmission time interval, if the given packet is judged not to be a designated packet.

8. The computer-readable, non-transitory medium according to claim 6, wherein
the correcting, if wait time, which is the difference of the transmission time interval between the transmission of the preceding packet and the transmission of the designated packet less the transmission time intervals of the 2 packets corresponding to the preceding packet and the designated packet, is equal to or greater than the transmission time intervals of the 2 packets corresponding to the designated packet and the subsequent packet, includes setting the transmission time interval between the designated packet and the subsequent packet to a given value.

9. The computer-readable, non-transitory medium according to claim 6, wherein
the correcting includes correcting, based on wait time, each transmission time interval for packets subsequent to the 2 packets corresponding to the designated packet and the subsequent packet.

10. The computer-readable, non-transitory medium according to claim 6, the procedure further comprising:
comparing a transmission time interval for 2 consecutive packets transmitted to the second transmission destination and an acknowledgment time interval for 2 acknowledgment packets that are for the 2 consecutive packets and are from the second transmission destination;
determining relative performance of the first transmission destination and the second transmission destination, based on a comparison result obtained at the comparing; and
outputting a determination result obtained at the determining.

11. A testing apparatus comprising:
an acquiring unit that acquires a transmission time interval for a plurality of packets sequentially transmitted from a first transmission source to a first transmission destination;
a judging unit that, when the packets whose destination has been changed to a second transmission destination are sequentially transmitted, from a second transmission source, according to the acquired transmission time interval, judges whether a given packet to be transmitted is a designated packet requiring reception of an acknowledgment packet transmitted from the second transmission destination for a preceding packet transmitted before the given packet;
a first transmitting unit that transmits the given packet after the reception of the acknowledgment packet for the preceding packet, even if transmission timing according to the transmission time interval has passed, if the given packet is judged to be a designated packet;
a correcting unit that, if a transmission time interval between transmission of the preceding packet and transmission of the designated packet exceeds transmission time intervals for 2 packets that correspond to the preceding packet and the designated packet and that are among the packets transmitted from the first transmission source to the first transmission destination, corrects a transmission time interval between the designated packet and a subsequent packet transmitted subsequent to the designated packet, to be shorter than transmission intervals for 2 packets that correspond to the designated packet and the subsequent packet and that are among the packets transmitted from the first transmission source to the first transmission destination; and
a second transmitting unit that transmits the subsequent packet from the second transmission source to the second transmission destination, at the corrected transmission time interval.

12. A method for testing using a computer, the method comprising:
acquiring a transmission time interval for a plurality of packets sequentially transmitted from a first transmission source to a first transmission destination;
judging, when the packets whose destination has been changed to a second transmission destination are sequentially transmitted, from a second transmission source, according to the acquired transmission time interval, whether a given packet to be transmitted is a designated packet requiring reception of an acknowledgment packet transmitted from the second transmission destination for a preceding packet transmitted before the given packet;
transmitting the given packet after the reception of the acknowledgment packet for the preceding packet, even if transmission timing according to the transmission time interval has passed, if the given packet is judged to be a designated packet;
correcting, if a transmission time interval between transmission of the preceding packet and transmission of the designated packet exceeds transmission time intervals for 2 packets that correspond to the preceding packet and the designated packet and that are among the packets transmitted from the first transmission source to the first transmission destination, a transmission time interval between the designated packet and a subsequent packet transmitted subsequent to the designated packet, to be shorter than transmission intervals for 2 packets that correspond to the designated packet and the subsequent packet and that are among the packets transmitted from the first transmission source to the first transmission destination; and transmitting the subsequent packet from the second transmission source to the second transmission destination, at the corrected transmission time interval.

13. An apparatus comprising:

a processor to judge, based on a transmission time interval for a plurality of packets sequentially transmitted from a first transmission source to a first transmission destination, when the packets whose destination has been changed to a second transmission destination are sequentially transmitted, from a second transmission source, according to the acquired transmission time interval, whether a given packet to be transmitted is a designated packet requiring reception of an acknowledgment packet transmitted from the second transmission destination for a preceding packet transmitted before the given packet;

a transmitting unit to transmit the given packet after the reception of the acknowledgment packet for the preceding packet, even if transmission timing according to the transmission time interval has passed, if the given packet is judged to be a designated packet, wherein the processor corrects, if a transmission time interval between transmission of the preceding packet and transmission of the designated packet exceeds transmission time intervals for 2 packets that correspond to the preceding packet and the designated packet and that are among the packets transmitted from the first transmission source to the first transmission destination, a transmission time interval between the designated packet and a subsequent packet transmitted subsequent to the designated packet, to be shorter than transmission intervals for 2 packets that correspond to the designated packet and the subsequent packet and that are among the packets transmitted from the first transmission source to the first transmission destination, and the transmitting unit transmits the subsequent packet from the second transmission source to the second transmission destination, at the corrected transmission time interval.

* * * * *